US012581178B2

(12) United States Patent  
Acs et al.

(10) Patent No.: US 12,581,178 B2  
(45) Date of Patent: Mar. 17, 2026

(54) CAMERA ASSEMBLY ARRANGEMENT FOR VEHICLE REAR VIEW COVER AND REAR VIEW DEVICE THEREWITH

(71) Applicant: MOTHERSON INNOVATIONS COMPANY LIMITED, London (GB)

(72) Inventors: Levente Acs, Dammarie les Lys (FR); Thomas Baggi, Dammarie les Lys (FR); Francis Charlet, Dammarie les Lys (FR); Steve Horne, Portchester (GB); Mikhail Kudryavtsev, Stuttgart (DE); Tobias Schwenger, Stuttgart (DE); Thorsten Staiger, Stuttgart (DE); Steve Rawding, Portchester (GB); Wilfried Bonny, Dammarie les Lys (FR)

(73) Assignee: Motherson Innovations Company Limited, London (GB)

( * ) Notice: Subject to any disclaimer, the term of this patent is extended or adjusted under 35 U.S.C. 154(b) by 114 days.

(21) Appl. No.: 18/416,335

(22) Filed: Jan. 18, 2024

(65) Prior Publication Data

US 2024/0163542 A1 May 16, 2024

Related U.S. Application Data

(63) Continuation-in-part of application No. 17/839,623, filed on Jun. 14, 2022, now Pat. No. 12,311,847.

(30) Foreign Application Priority Data

Jun. 22, 2021 (DE) ..................... 10 2021 116 131.2

(51) Int. Cl.  
*H04N 23/57* (2023.01)  
*B60R 1/26* (2022.01)  
(Continued)

(52) U.S. Cl.  
CPC ............... *H04N 23/57* (2023.01); *B60R 1/26* (2022.01); *B60R 11/04* (2013.01); *H04N 23/685* (2023.01);  
(Continued)

(58) Field of Classification Search  
CPC ........ H04N 23/57; H04N 23/685; B60R 1/26; B60R 11/04; B60R 2011/0052;  
(Continued)

(56) References Cited

U.S. PATENT DOCUMENTS 8,866,907 B2 * 10/2014 McElroy ................ H04N 23/55  
                                                 348/148  
9,150,165 B1 * 10/2015 Fortin ..................... B60R 11/04  
(Continued)

FOREIGN PATENT DOCUMENTS

DE     102014113992     3/2016  
DE     202016105674     12/2016  
WO   WO 2008/068573     6/2008

OTHER PUBLICATIONS

German Patent Office, Appl. No. 10 2021 116 131.2, Office Action, Feb. 25, 2022.  
(Continued)

*Primary Examiner* — Jared Walker  
(74) *Attorney, Agent, or Firm* — Jones Day

(57) ABSTRACT

The present disclosure relates to a camera assembly arrangement for a vehicle rear view cover. In an embodiment, the rear view cover comprises a plurality of alignment elements and at least one attachment element, and a camera cradle of the camera assembly comprises at least one attachment arm that secures the camera assembly to the at least one attachment element of the rear view cover. The camera cradle further comprises a plurality of spring elements configured to press a camera module against the plurality of alignment  
(Continued)

elements of the rear view cover to align the at least one attachment arm of the camera cradle with the at least one attachment element of the rear view cover and to restrict movement of the camera assembly when secured to the rear view cover.

10 Claims, 17 Drawing Sheets

(51) Int. Cl.
    *B60R 11/00*        (2006.01)
    *B60R 11/04*        (2006.01)
    *H04N 23/68*       (2023.01)

(52) U.S. Cl.
    CPC ................. *B60R 2011/0052* (2013.01); *B60R 2011/0059* (2013.01); *B60R 2011/0063* (2013.01)

(58) Field of Classification Search
    CPC ..... B60R 2011/0059; B60R 2011/0063; B60R 2001/1253; B60R 1/12; B60R 2011/004
    See application file for complete search history.

(56) References Cited

U.S. PATENT DOCUMENTS

| | | | | |
|---|---|---|---|---|
| 9,908,482 | B1 * | 3/2018 | Falstrup | F16M 13/00 |
| 9,989,835 | B1 * | 6/2018 | Gomez | B60R 11/04 |
| 10,369,936 | B2 * | 8/2019 | Leonelli, Jr. | G03B 17/55 |
| 10,676,041 | B2 * | 6/2020 | Sesti | H04N 23/57 |
| 10,981,518 | B1 * | 4/2021 | Krishnan | H04N 7/18 |
| 2009/0122141 | A1 * | 5/2009 | Nakamura | B60R 11/04 |
| | | | | 348/148 |
| 2010/0196000 | A1 * | 8/2010 | Watanabe | B60R 11/04 |
| | | | | 396/429 |
| 2010/0231719 | A1 | 9/2010 | Nakamura et al. | |
| 2010/0245572 | A1 * | 9/2010 | Son | B60R 13/105 |
| | | | | 348/148 |
| 2011/0255854 | A1 * | 10/2011 | Chapman | F16M 11/42 |
| | | | | 396/428 |
| 2013/0045002 | A1 * | 2/2013 | Zhang | G03B 11/043 |
| | | | | 396/429 |
| 2014/0055617 | A1 * | 2/2014 | Minikey, Jr. | B60R 11/00 |
| | | | | 348/148 |
| 2014/0158731 | A1 * | 6/2014 | Squire | B60R 11/04 |
| | | | | 224/545 |
| 2014/0168437 | A1 * | 6/2014 | Rother | B60R 1/26 |
| | | | | 348/148 |
| 2015/0008300 | A1 * | 1/2015 | Jagoda | B60R 11/04 |
| | | | | 248/309.1 |
| 2015/0312456 | A1 * | 10/2015 | Bauer | H04N 23/51 |
| | | | | 348/374 |
| 2016/0299409 | A1 * | 10/2016 | Havskjold | H04M 1/0264 |
| 2017/0015256 | A1 * | 1/2017 | Henion | B60R 1/003 |
| 2017/0023849 | A1 * | 1/2017 | Chapman | F16M 11/2007 |
| 2017/0097230 | A1 * | 4/2017 | Rogers | B60S 5/00 |
| 2017/0205688 | A1 * | 7/2017 | Chapman | F16M 11/18 |
| 2017/0242321 | A1 * | 8/2017 | Hehir | G03B 17/55 |
| 2018/0065555 | A1 * | 3/2018 | Filipiak | B60R 1/04 |
| 2020/0074675 | A1 * | 3/2020 | Cejka | F16M 11/42 |
| 2021/0031689 | A1 * | 2/2021 | Bhaskar | B60R 1/1207 |
| 2022/0368836 | A1 * | 11/2022 | Yeo | F16M 11/26 |
| 2022/0373762 | A1 * | 11/2022 | Skrocki | G03B 30/00 |
| 2023/0375849 | A1 * | 11/2023 | Harari | H04N 23/55 |

OTHER PUBLICATIONS

UK Patent Office, Appl. No. GB2208607.8, Search and Examination Report, Dec. 7, 2022.

\* cited by examiner

Fig. 4a            Fig. 4b

CAMERA ASSEMBLY ARRANGEMENT FOR VEHICLE REAR VIEW COVER AND REAR VIEW DEVICE THEREWITH

CROSS-REFERENCE TO RELATED APPLICATION

This application is a continuation-in-part of U.S. patent application Ser. No. 17/839,623, filed Jun. 14, 2022, which claims the benefit of priority to German Patent Application DE 10 2021 116 131.2, filed on Jun. 22, 2021, each of which are incorporated herein by reference in their entirety.

FIELD

The present disclosure relates to a vehicle rear view mirror and in particular to camera assembly arrangement for vehicle rear view cover and rear view device therewith.

BACKGROUND

The statements in this section merely provide background information related to the present disclosure and may not constitute prior art.

Generally, a vehicle rear view mirror arrangement includes a reflecting surface such as mirrors which are used for viewing the road condition and other approaching vehicles from rear, left and right ends of the vehicle. However, the reflecting surface does not capture the entire rear, left or right view creating blind spots which cannot be viewed by the driver. To enhance the driver's view and to eliminate potential blind spots, camera(s) is/are mounted on the rear view mirror. Mounting of camera(s) in the rear view mirror adds to the complexity of design and assembly of the rear view mirrors. Conventional rear camera assembly usually includes a camera and its housing/cradle in which the camera is fitted. The camera assembly is then assembled into the rear view mirror. Generally, cameras are sized based on the vehicle type and functionality of the camera chosen. Thus, the camera casing/cradle also comes in different sizes to complement the chosen camera size. The different sized camera and camera casing/cradle combination assembly adds complexity when used in a common rear view mirror.

EP3371652A1 discloses a camera module comprising a camera housing, said camera housing having a base body and a retaining ring, said retaining ring being designed as a one piece with the housing base body. The camera module is connected to the vehicle by means of screw and bolt arrangement. The camera module may be misaligned due to vibration effects in the vehicle. Further, manufacturing different sized camera housing for different sized camera adds to the overall cost.

To overcome the above-mentioned problems, it may be desirable to provide a simple and stable camera assembly which minimizes the vibration effects of the vehicle. It may also be desirable to provide a camera assembly for different sized cameras.

SUMMARY

According to an embodiment a camera assembly arrangement for vehicle rear view cover comprises the rear view cover, wherein the rear view cover comprises at least one alignment element; a camera assembly, wherein the camera assembly comprises a camera module with a lens and at least one of a cover and a camera cradle for mounting the camera module, wherein at least one of (i) there are at least four alignment elements to align the camera assembly to the rear view cover, with the alignment elements comprising at least two stiff ribs and at least two spring elements such that the camera assembly is pressed by the spring elements against the stiff ribs and onto the rear view cover, and (ii) the camera cradle is provided with at least one outrigger slider, with the at least one alignment element cooperates with the at least one outrigger slider and at least one clip fastener is retained on at least one shoulder, with the at least one clip fastener being configured on one of the rear view cover and the camera assembly and the at least one shoulder being configured on one of the camera assembly and the rear view cover.

In accordance with a further embodiment the lens of the camera assembly is configured to be inserted into an aperture of the rear view cover, wherein the lens is aligned to face rearwardly downward of the vehicle rear view cover. The configuration of the lens and the aperture of the rear view cover enables the driver to view blind spots which are not visible by the reflecting surface of the rear view minor.

In accordance with a further embodiment the camera cradle has an inside surface with at least one rib and at least one stand-off pad. The at least one stand-off pad and at least one rib are adapted to align the camera module in the camera cradle. The at least one stand-off pad and the at least one rib may vary in size to enable different sized camera module to fit in the camera cradle.

In accordance with a further embodiment the camera cradle has at least one supporting protrusion on an outer surface. The at least one supporting protrusion supports the camera cradle on the rear view cover.

In accordance with a further embodiment geometry of the at least one supporting protrusion corresponds to geometry of the rear view cover for tuning of angular position of the camera assembly. The camera assembly may be adjusted to a desired angle by using at least one supporting protrusion. The at least one supporting protrusion may also be adjusted to accurately mount the camera assembly on the rear view cover.

According to another embodiment the camera assembly includes a plate for supporting the camera cradle on the rear view cover. The plate may be contoured to allow the camera cradle to be adjusted to a desired angle.

In accordance with a further embodiment the camera assembly includes a cover and a clamp for mounting the camera module inside the camera cradle. The cover and the clamp rigidly fix the camera module inside the camera cradle and prevents movement of camera module inside the camera cradle due to any mechanical vibration.

In accordance with a further embodiment the camera module includes a ventilation element. The ventilation element enables cooling down of camera module by dissipating heat from the camera module to the outside environment.

In accordance with a further embodiment the camera cradle includes an arm aligned with and fastened to an attachment element of the rear view cover. The configuration of the arm and the attachment point provides constrained joint between the camera cradle and the rear view cover, which prevents any movement of the camera assembly with respect to the rear view cover, even in case of any mechanical vibrations.

According to another embodiment the cradle has two outrigger sliders corresponding to two alignment elements of the rear view cover. The outrigger sliders cooperate with the alignment element for slidably mounting the camera assembly on the rear view cover. This configuration prevents movement of the camera assembly in the rear view cover.

In accordance with a further embodiment the rear view cover is a lower housing.

According to another embodiment the rear view cover is a bezel.

In accordance with a further embodiment at least one or two stiff ribs and at least one spring element are arranged opposite to each other to align the camera assembly.

According to another embodiment the alignment elements are arranged on four sides facing the camera assembly mounted on the rear view cover, with two first sides providing at least one or two stiff ribs and two second sides providing at least one spring element, wherein the two first sides are arranged next to each other and the two second sides are arranged next to each other such that each first side is opposite a second side.

In accordance with a further embodiment the cover of the camera assembly is provided with an extended arm with a hole aligned to a hole of an attachment element of the rear view cover for a fastener or screw to fix the attachment of the camera assembly to the rear view cover.

According to another embodiment the cover of the camera assembly is provided with a shoulder and each rib is provided with a shoulder to house the camera module between said shoulders.

In accordance with a further embodiment the cover of the camera assembly or the extended arm of the cover of the camera assembly is provided with a ramp for pressing the at least one spring element of the rear view cover against the camera module and the camera module against the at least one or two ribs arranged opposite the spring element.

The present disclosure also refers to a rear view device with a camera assembly arrangement as described above.

In an embodiment, a vehicle rear view device comprises a camera assembly that includes a camera module with a lens and a camera cradle for mounting the camera module, wherein the camera cradle includes a plurality of outrigger sliders and an attachment arm, and a rear view cover that includes a plurality of alignment elements and an attachment element, wherein the attachment element secures the attachment arm of the camera cradle to the rear view cover. Each of the plurality of alignment elements form a channel for receiving one of the plurality of outrigger sliders of the camera cradle, and the plurality of alignment elements are configured to (i) restrict movement of the camera assembly in all directions except longitudinally along the channels and (ii) align the attachment arm of the camera cradle with the attachment element.

In another embodiment, a vehicle rear view device comprises a camera assembly that includes a camera module with a lens and a camera cradle for mounting the camera module, and a rear view cover onto which the camera assembly is mounted. The rear view cover comprises a plurality of alignment elements and at least one attachment element. The camera cradle comprises at least one attachment arm that secures the camera assembly to the at least one attachment element of the rear view cover. The camera cradle further comprises a plurality of spring elements configured to press the camera module against the plurality of alignment elements of the rear view cover to align the at least one attachment arm of the camera cradle with the at least one attachment element of the rear view cover and to restrict movement of the camera assembly when secured to the rear view cover. In an embodiment, the at least one attachment element of the rear view cover includes threading for receiving a fastener, and the at least one attachment arm includes a hole through which the fastener is extended to secure the at least one attachment arm to the at least one attachment element. In an embodiment, the rear view cover includes a plurality of attachment elements and the camera cradle includes a corresponding plurality of attachment arms. In an embodiment, the plurality of attachment elements and the plurality of alignment elements are arranged on the rear view cover such that torque applied to fasten the plurality of attachment arms of the camera cradle to the plurality of attachment elements restricts movement of the camera assembly by pressing the camera assembly into the plurality of alignment elements. In an embodiment, the rear view cover further includes a mounting pedestal onto which the camera assembly is mounted. In an embodiment, the torque applied to fasten the plurality of attachment arms to the plurality of attachment elements further restricts movement of the camera assembly by pressing the camera assembly into the mounting pedestal.

It should be noted that the features set out individually in the following description can be combined with each other in any technically advantageous manner and set out other forms of the present disclosure. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number. The description further characterizes and specifies the present disclosure in particular in connection with the figures.

BRIEF DESCRIPTION OF THE DRAWINGS

In order that the disclosure may be well understood, there will now be described various forms thereof, given by way of example, reference being made to the accompanying drawings, in which:

FIG. 4a illustrates a front view of camera assembly having a camera module and a camera cradle in disassembled state in accordance with an embodiment of the present disclosure;

FIG. 4b illustrates a front view of the camera assembly of FIG. 4a showing a cover and a clamp for fixing the camera module inside the camera cradle;

DETAILED DESCRIPTION

Figure 1:
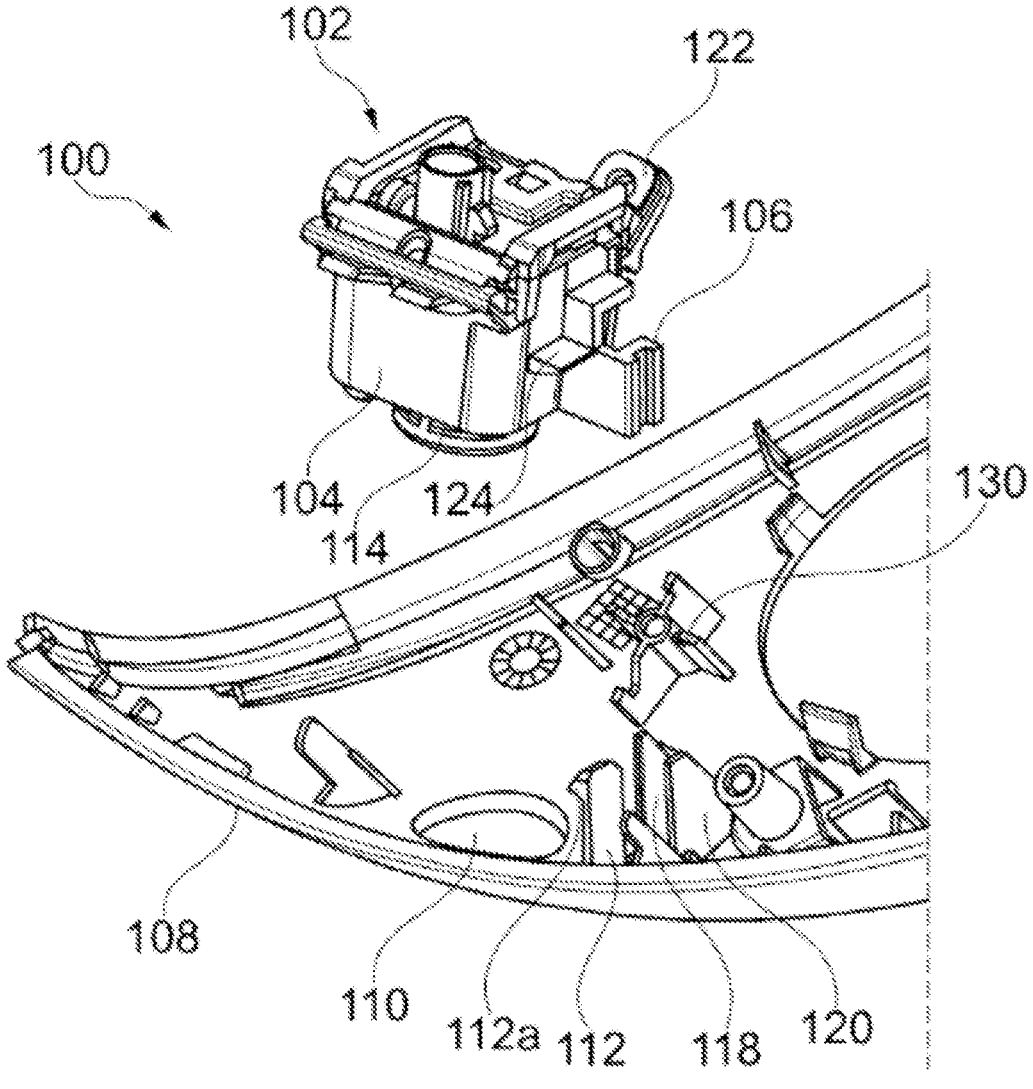
FIG. 1 illustrates an exploded perspective view of the camera assembly arrangement with a rear view cover according to an embodiment of the present disclosure.

The following description is exemplary in nature and is not intended to limit the present disclosure, application, or uses. It should be understood that throughout the drawings, corresponding reference numerals indicate like or corresponding parts and features.

FIG. 1 illustrates a perspective view of the camera assembly arrangement 100 according to an embodiment of the present disclosure. The camera assembly arrangement 100 comprises a rear view cover 108 and a camera assembly 102 attachable to the rear view cover 108. In FIG. 1 the camera assembly 102 is shown in an exploded view with the rear view cover 108. The rear view cover 108 has at least one clip fastener 112 extending from the bottom of the rear view cover 108. The at least one clip fastener 112 also has a free end which includes a clip 112*a* where the at least one clip fastener 112 acts like a cantilever beam and has an elastic springback function. The clip 112*a* of the at least one clip fastener 112 is configured to cooperate with a shoulder 124 disposed on a camera cradle 104 of the camera assembly 102. The at least one clip fastener 112 allows for assembly of the camera cradle 104 of the camera assembly 102 into the rear view cover 108 and holds the camera cradle 104 of the camera assembly 102 in position until a fastener is fastened through an arm 122 of the camera cradle 104. The at least one clip fastener 112 also provides another connection point to reduce vibration.

The rear view cover 108 further comprises at least one alignment element 118, 120. In an embodiment, the at least one alignment element includes a first alignment element 118 and a second alignment element 120. The first alignment element 118 and the second alignment element 120 are attached to the bottom of the rear view cover 108. The first alignment element 118 and the second alignment element 120 form a channel for allowing an outrigger slider 106 disposed on the camera cradle 104 of the camera assembly 102 to slide between the first alignment element 118 and the second alignment element 120. The at least one alignment element 118, 120 restricts the movement of the camera cradle 104 of the camera assembly 102 in all directions except longitudinally along the channel.

The rear view cover 108 further includes an attachment element 130. The attachment element 130 is configured at the bottom of the rear view cover 108. The attachment element 130 may include a threaded hole for fastening the arm 122 of the camera cradle 104 of the camera assembly 102 via the fastener. The arm 122 of the camera cradle 104 is aligned with the attachment element 130 and the fastener is used to secure the camera cradle 104 to the attachment element 130 of the rear view cover 108. The arm 122 also acts like a poke yoke since the arm 122 also ensures correct alignment of camera assembly 102 on the rear view cover 108. If the arm 122 is not aligned with the attachment element 130 then the camera assembly 102 is not in the correct place.

The rear view cover 108 further includes an aperture 110. The aperture 110 is configured to receive a lens 114 of the camera assembly 102. The aperture 110 allows the lens 114 to be exposed outside the rear view cover 108 for capturing images outside the rear view cover 108. In an embodiment, the lens 114 is aligned to face rearwardly downward of the rear view cover 108. The at least one alignment element 118, 120 ensures alignment of the lens 114 with the aperture 110.

Figure 2:
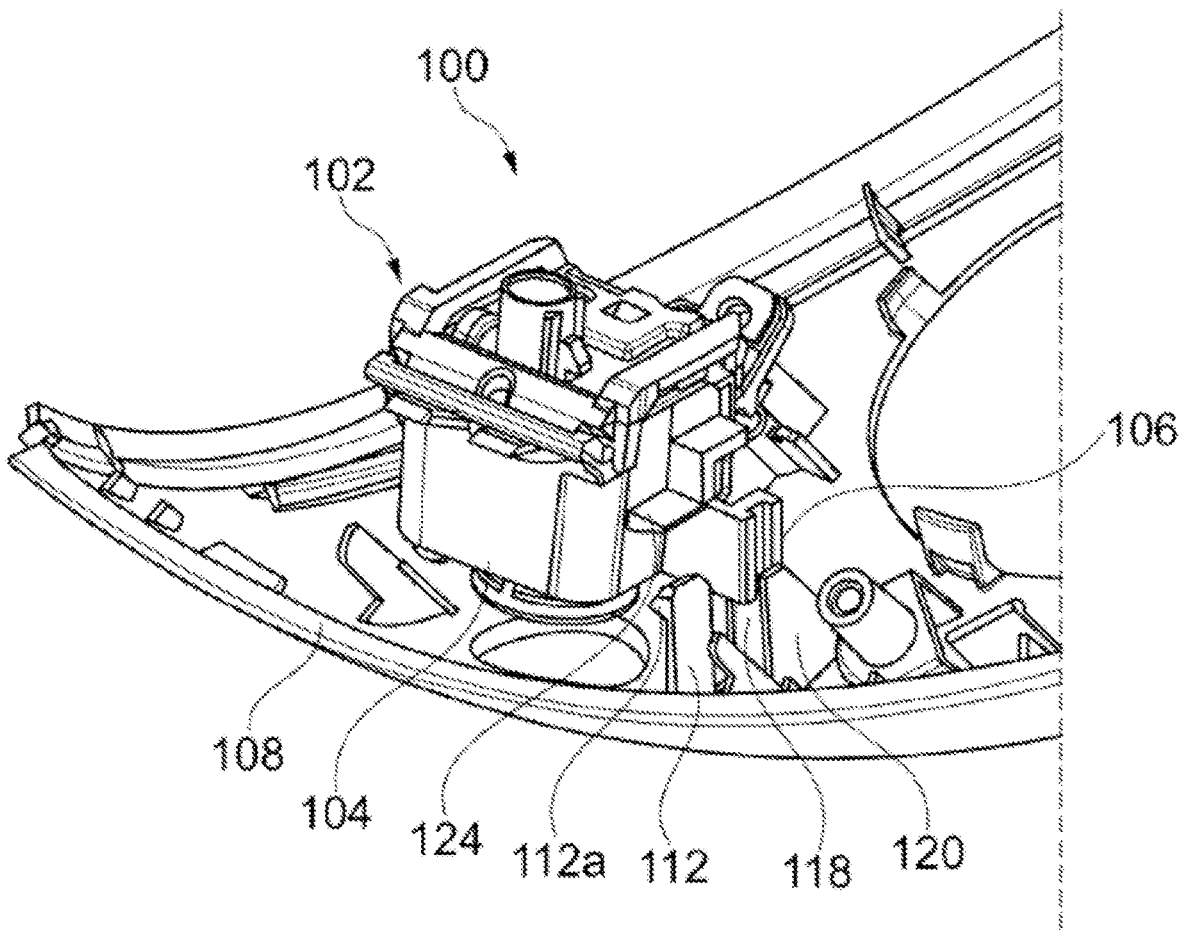
FIG. 2 illustrates a perspective view of the camera assembly arrangement of FIG. 1 in which the camera assembly is in close proximity with the rear view cover for illustrating connecting elements of the camera assembly and the rear view cover.

FIG. 2 illustrates a perspective view of the camera assembly fixing arrangement 100 in which the camera assembly 102 is in close proximity with the rear view cover for illustrating connecting elements of the camera assembly 102 and the rear view cover 108. As shown in FIG. 2, the outrigger slider 106 of the camera assembly 102 is partially inserted in the channel formed between the first alignment element 118 and the second alignment element 120. FIG. 2 also illustrates the at least one clip fastener 112 along with the clip 112*a*, which is adapted to be coupled with the at least one shoulder 124 of the camera cradle 104. The at least one shoulder 124 is a wedge-shaped structure having a wedge shape on bottom surface and a flat portion on top surface. The clip 112*a* of the at least one clip fastener 112 is adapted to slide on the wedge surface of the at least one shoulder 124 and rest on the top surface of the at least one shoulder 124, thus fixing the camera cradle 104 of the camera assembly 102 on the rear view cover 108, as shown in FIG. 3.

Figures 3, 3A:
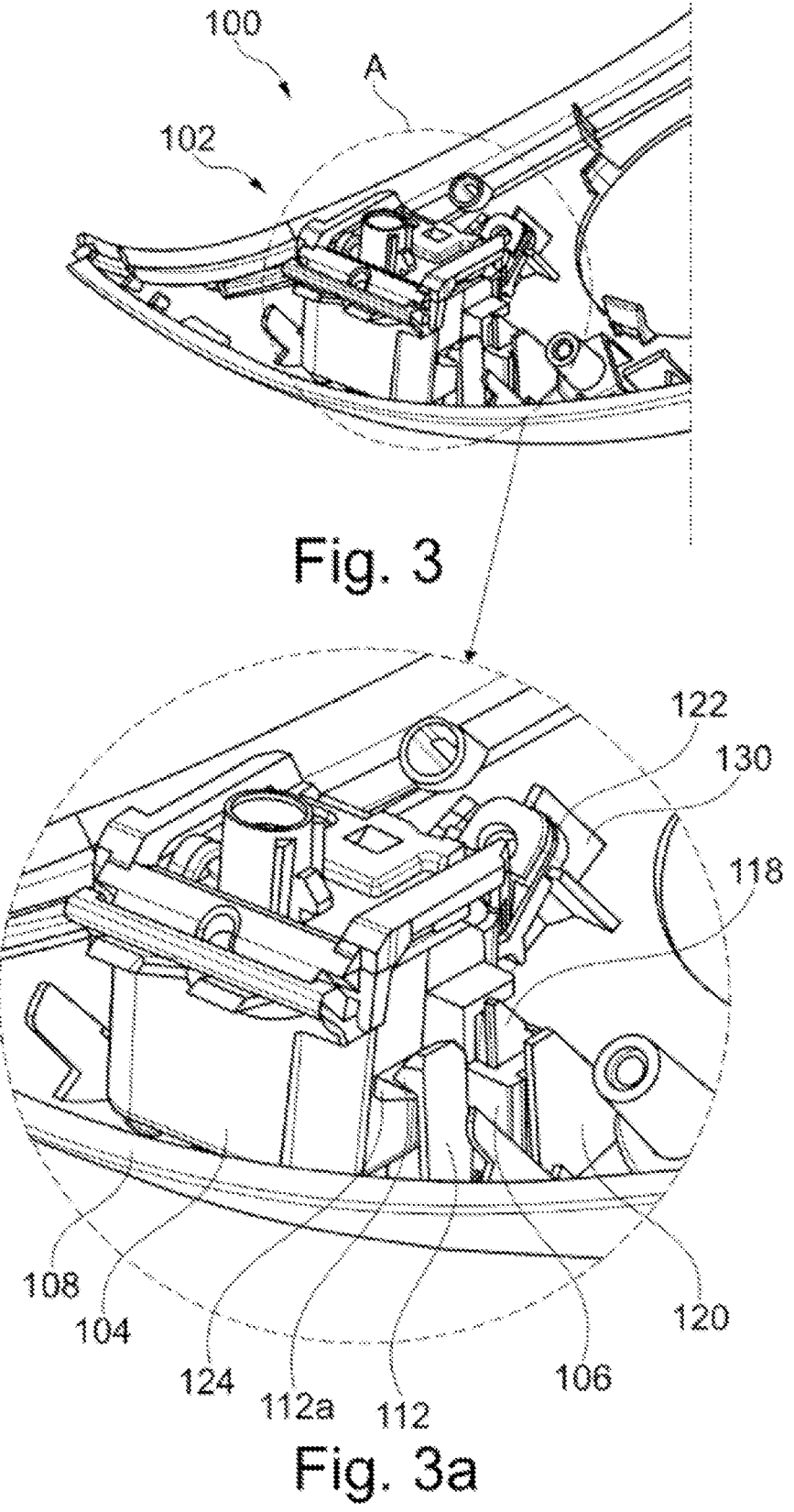
FIG. 3 illustrates a perspective view of the camera assembly arrangement of FIG. 1 in which the camera assembly is assembled with the rear view cover.
FIG. 3a illustrates an enlarged view of a portion "A" of FIG. 3.

FIG. 3 illustrates a perspective view of the camera assembly arrangement 100 in which the camera assembly 102 is assembled with the rear view cover 108. FIG. 3*a* illustrates an enlarged view of a portion "A" of FIG. 3. As shown in FIG. 3*a*, the outrigger slider 106 of the camera assembly 102 is completely inserted in the channel formed between the first alignment element 118 and the second alignment element 120. The clip 112*a* of the at least one clip fastener 112 of the rear view cover 108 rests on the top surface of the at least one shoulder 124 of the camera cradle 104 of the camera assembly 102. This configuration of the at least one clip fastener 112 of the rear view cover 108 with the at least one shoulder 124 of the camera cradle 104 and the at least one alignment element 118, 120 with the at least one outrigger slider 106 provides stability to the camera assembly 102 in the rear view cover 108 and provides resistance to mechanical vibrations. This configuration reduces the complexity of attaching the camera assembly 102 to the rear view cover 108 by providing alignment and an initial retention of the camera assembly 102 on the rear view cover 108. The arm 122 of the camera cradle 122 is aligned with the attachment element 130 and the fastener is used to secure the camera cradle 104 to the attachment element 130 of the rear view cover 108 to fix the camera assembly 102 on the rear view cover 108.

Figure 4C:
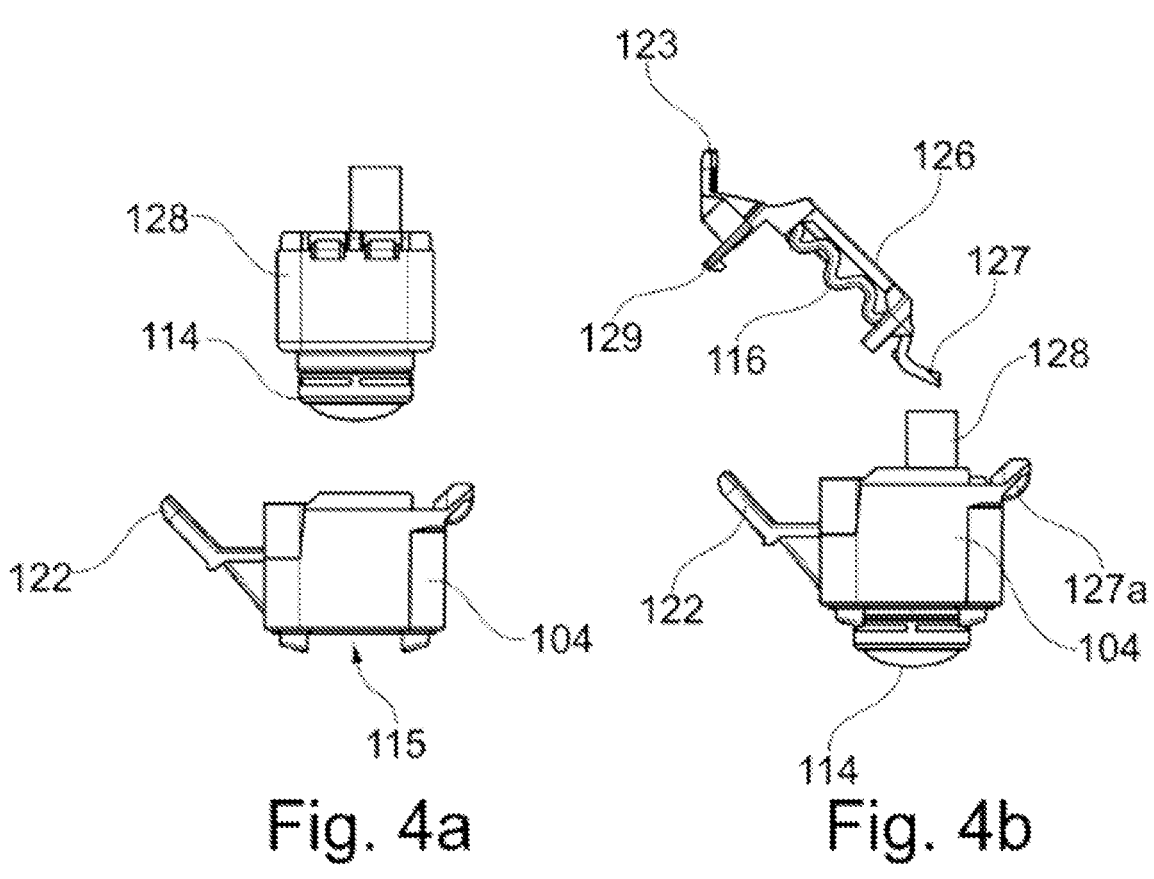
FIG. 4c illustrates a front view of the camera assembly of FIG. 4b in assembled state.
Figure 4C:
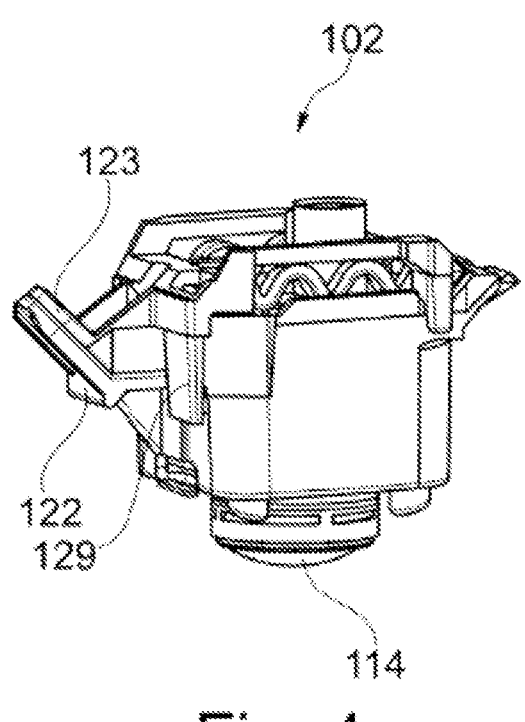

FIG. 4a illustrates a front view of camera assembly 102 having camera module 128 exploded out from the camera cradle 104. The camera module 128 is adapted to be mounted inside an inner portion of the camera cradle 104 such that the lens 114 of the camera module extends through an opening 115 of the camera cradle 104 as illustrated in FIG. 4b. FIG. 4c illustrates the camera assembly 102 in assembled state. The camera cradle 104 includes the arm 122 having a circular hole, which aligns with the threaded hole of the attachment element 130 of the rear view cover 108, as shown in FIGS. 1-3. The camera assembly 102 further includes a cover 126. The cover 126 is adapted to cover and protect the camera module 128 inside the camera cradle 104. The cover 126 has a hook 127 on one side of the cover 126 and is adapted to fix the cover 126 on the camera cradle 104 from one side. The hook 127 of the cover 126 is adapted to be inserted into a loop 127a of the camera cradle 104. The configuration of the hook 127 and the loop 127a is clearly shown in FIG. 8. The cover 126 further includes a clip 129 on the other side. The clip 129 is adapted to be clamped on outer surface of the camera cradle 104, as shown in FIGS. 4a-4c and FIG. 8. Thus, the cover 126 is fixed on the camera cradle 104 by using the hook 127 on one side and the clip 129 on the other side. The cover 126 further includes an extended arm 123. The extended arm 123 has a circular hole which corresponds to the circular hole of the arm 122 of the camera cradle 104. The extended arm 123 is adapted to align with the arm 122 of the camera cradle 104. This configuration of extended arm 123 and the arm 122 is further fastened to the rear view cover 108 at the attachment element 130. Holes of the extended arm 123 and the arm 122 align with the threaded hole of the attachment element 130 and then a fastener (not shown) is fastened for fixing the camera assembly 102 on the rear view cover 108.

The camera assembly 102 further includes a clamp 116. The clamp 116 is a spring-like structure disposed below the cover 126 and is adapted to push the camera module 128 against the camera cradle 104. The spring structure of the clamp 116 is to apply a force to the camera module 128 to seat and retain the camera module 128 against the bottom of the camera cradle 104 to ensure the camera module 128 is stabilized for vibration and maintains the proper seating of the lens 114 through the camera cradle 104. This configuration provides rigidity to the camera assembly 102, and the camera module 128 does not get loosened or displaced from its position, and thus resulting in making the camera assembly 102 vibration proof.

Figure 5:
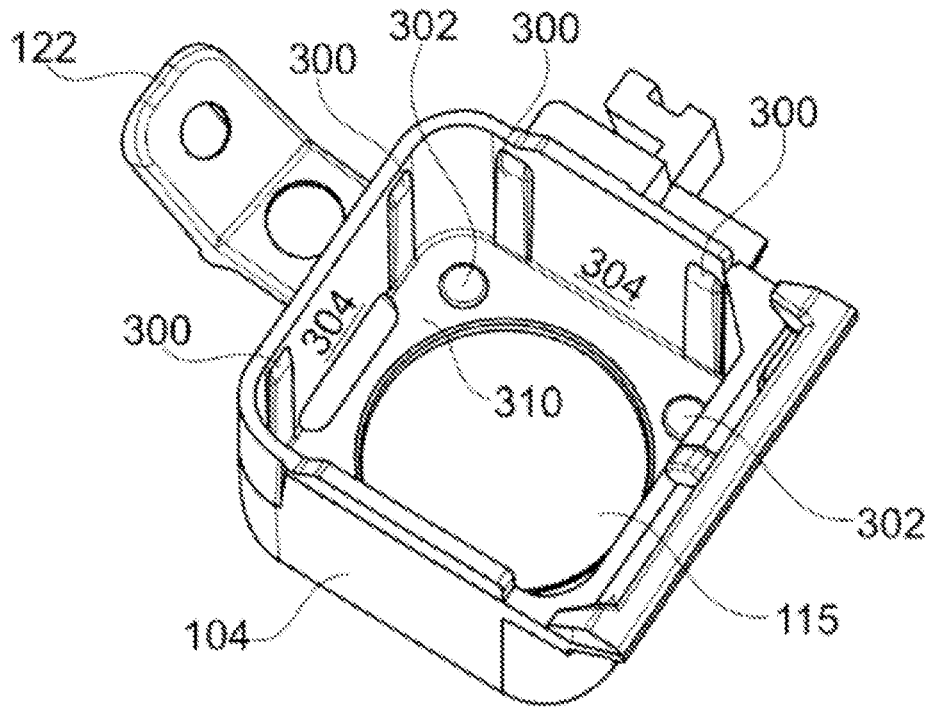
FIG. 5 illustrates a top perspective view of the camera cradle.

FIG. 5 illustrate a perspective view of the inside portion of the camera cradle 104. The cradle 104 has four side portions 304 and a bottom portion 310. The bottom portion 310 of the camera cradle 104 has the opening 115 corresponds to the shape of the lens 114 for allowing the lens 114 to extend outside the camera cradle 104. In an embodiment, the opening 115 is circular. The camera cradle 104 further includes at least one rib 300 configured on at least one side portion 304 and at least one stand-off pads 302 configured on the bottom portion 310 in the interior of camera cradle 104. In an embodiment each side portion 304 has two ribs 300, and the bottom portion 310 has four stand-off pads 302. Each stand-off pad 302 is configured at the corner of the bottom portion 310. The at least one rib 300 and the at least one stand-off pad 302 are adapted to support and align the camera module 128 in the camera cradle 104. The at least one rib 300 and the at least one stand-off pad 302 also provide rigidity to the camera assembly 102 and the camera module 128 does not get loosened or displaced from its position, and thus resulting in making the camera assembly 102 vibration proof.

The at least one rib 300 and the at least one stand-off pad 302 may vary in size and shape to accommodate different sized camera modules 128 to be fitted in the camera cradle 104 having same exterior configuration and dimensions. Thus, exterior configuration and dimension of the camera cradle 104 remain same, and the interior configuration and dimension of the camera cradle 104 may be modified to accommodate different sized camera module 128. This is useful while manufacturing the camera cradle 104 along with the at least one rib 300 and the at least one stand-off pad 302. Usually, the camera cradle 104 is manufactured by plastic molding method. When a different sized cradle is required to be molded, a different sized die is required to be used. Thus, usage of different-sized dies for molding different-sized camera cradle increases the manufacturing cost of the cradle. However, usage of same-sized die with different-sized ribs and stand-off pads, may substantially reduce the manufacturing cost of the cradle. In the present disclosure, the camera cradle 104 having standard exterior configuration and dimension is used, and the interior configuration and dimension of the camera cradle 104 may be varied by varying the shape and size of the at least one rib 300 and the at least one stand-off pad 302 for accommodating different sized camera module 128. Thus, the camera assembly 102 of the present disclosure is cost effective due to ease in manufacturing process. The camera assembly 102 is also advantageous for interchangeability of camera cradle 104 for using different-sized cameras.

Figure 6:
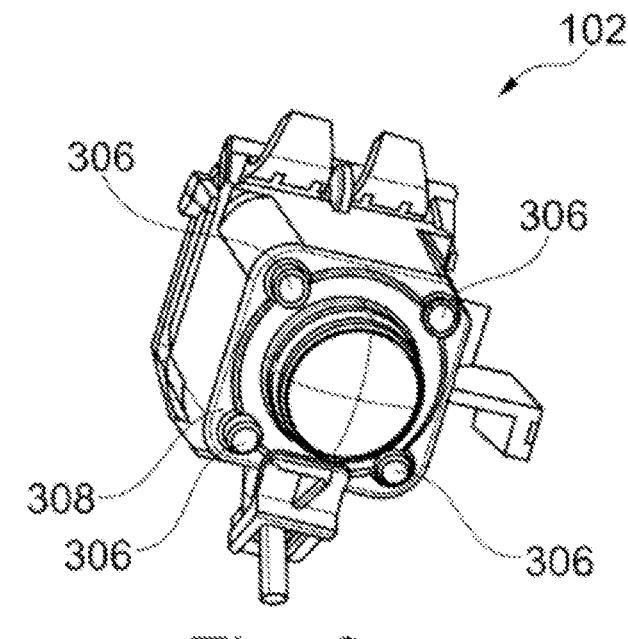
FIG. 6 illustrates a bottom perspective view of the camera assembly.

FIG. 6 illustrates a perspective view of outside portion of the camera cradle 104. The camera cradle has an outer surface 308. The camera cradle 104 also has at least one supporting protrusion 306 configured on the outer surface 308 of the camera cradle 104. In an embodiment, the at least one supporting protrusion includes four supporting protrusions 306, each supporting protrusion 306 being configured on each corner of the outer surface 308 of the camera cradle 104. The at least one supporting protrusion 306 is adapted to support the camera cradle 104 of the camera assembly 102 on the rear view cover 108.

Figure 7A:
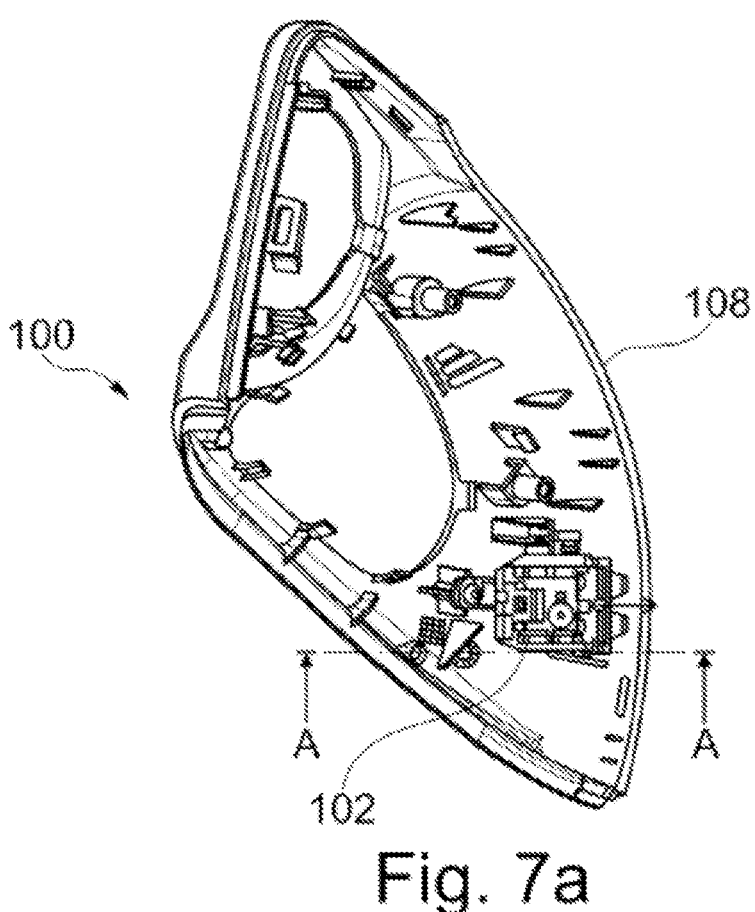
FIG. 7*a* illustrates a rear perspective view of the camera assembly arrangement of FIG. 1.
Figure 7B:
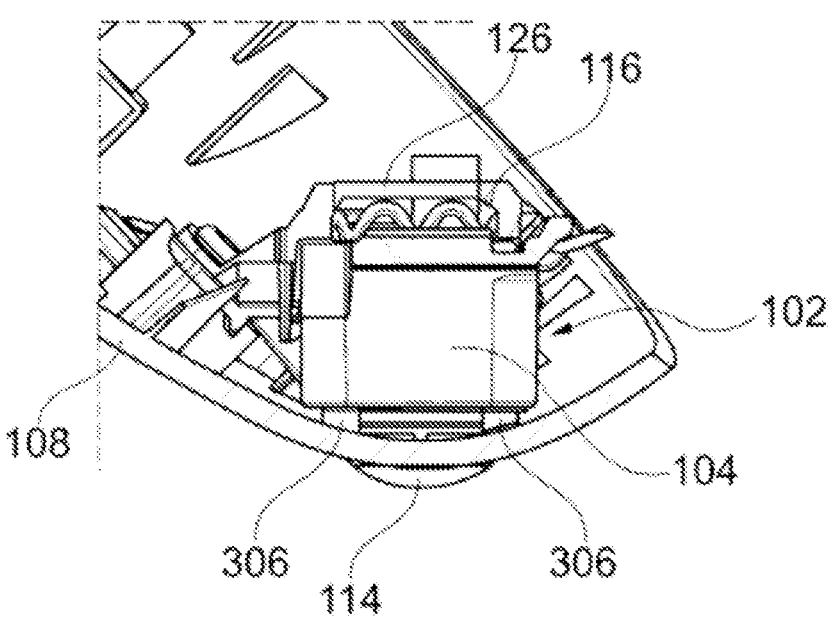
FIG. 7*b* illustrates a sectional view "A-A" of FIG. 7*a;*

FIG. 7a illustrates a perspective view of the camera assembly arrangement 100 showing the configuration of the camera assembly 102 on the rear view cover 108. FIG. 7b illustrates a section view 'A-A' of the of the camera assembly arrangement 100.

FIG. 7b shows the arrangement of the camera assembly 102 over the rear view cover 108. Geometry of the at least one supporting protrusion 306 of the camera cradle 104 corresponds to the geometry of the rear view cover 108. The at least one supporting protrusion 306 is shaped according to the shape of the rear view cover 108 such that the camera cradle 104 fits accurately on the rear view cover 108. The at least one supporting protrusion 306 may also be varied for tuning angular position of the camera assembly 102. This provides ability to align the lens 114 in respect to the rear view cover 108 for correct viewing angle. Thus, the at least one supporting protrusion 306 is advantageous for accurately mounting of the camera assembly 102 on the rear view cover 108 as well as tuning the angular position of the camera assembly 102 with respect to the rear view cover 108. The at least one supporting protrusion 306 may be molded into the camera cradle 104. In another embodiment, the at least one supporting protrusion 306 may be made from different material having different vibration absorption characteristics.

Figure 8:
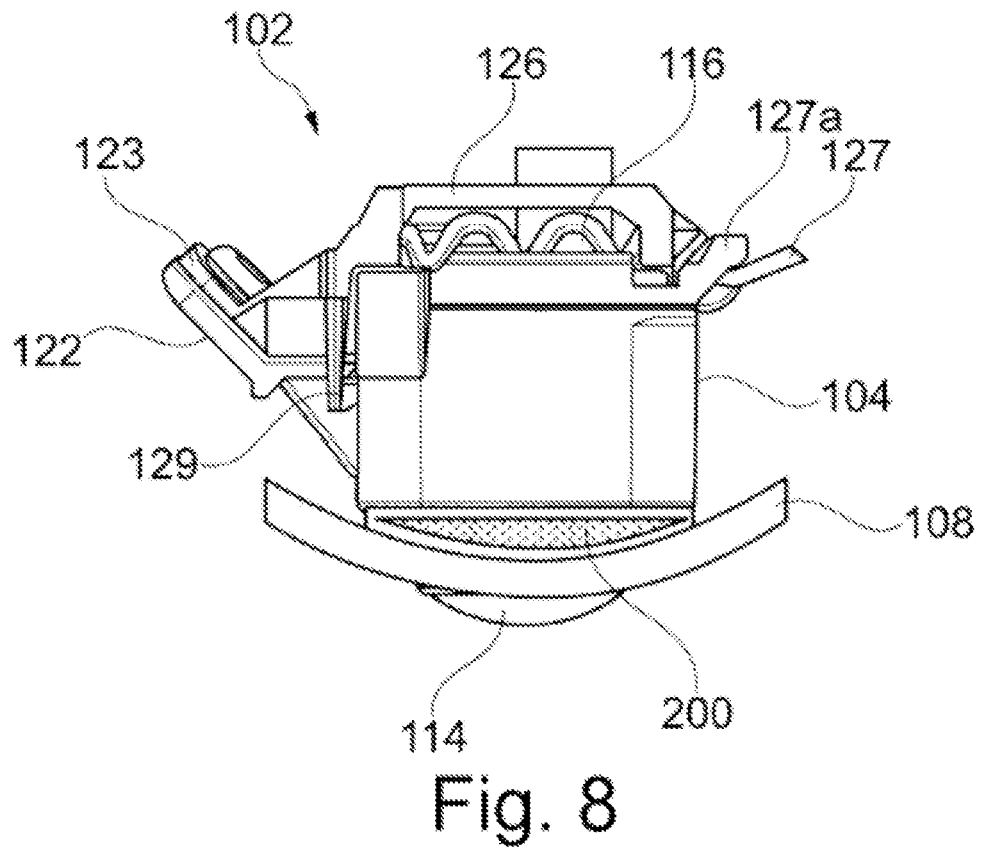
FIG. 8 illustrates a front view of camera assembly illustrating a plate, according to an embodiment of the present disclosure.
Figure 8A:
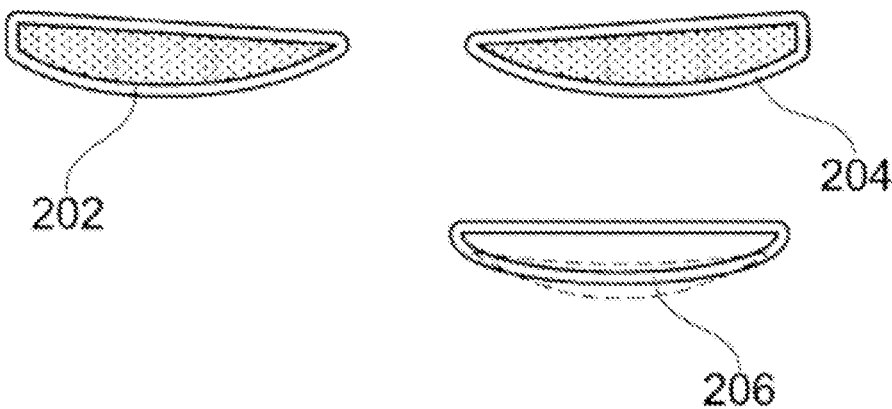
FIG. 8*a* illustrates various embodiments of the plate of FIG. 8.

In another embodiment, the at least one supporting protrusion may be replaced by a plate 200, 202, 204, 206, as shown in FIG. 8 and FIG. 8a. The plate 200, 202, 204, 206 may be configured on the outer surface 308 of the camera cradle 104. The plate 200, 202, 204, 206 is adapted to support the camera cradle 104 of the camera assembly 102 on the rear view cover 108. Geometry of the plate 200, 202, 204, 206 of the camera cradle 104 corresponds to the geometry of the rear view cover 108. The plate 200, 202, 204, 206 is shaped according to the shape of the rear view cover 108 such that the camera cradle 104 fits accurately on the rear view cover 108. The plate 200, 202, 204, 206 may be varied for tuning angular position of the camera assembly 102. FIG. 8a illustrates different embodiments of the plate 202, 204, 206. Any one of the plates 200, 202, 204, 206 may be used for accurate alignment of the camera assembly 102 on the rear view cover 108 based on the geometry of the rear view cover 108. Apart from the embodiments of plates 200, 202, 204, 206 shown in FIG. 8 and FIG. 8a, other shaped plates may be selected based on the desired geometry of the rear view cover and the angular position of the camera assembly 102 with respect to the rear view cover 108. Thus, the plate 200, 202, 204, 206 is advantageous for accurately mounting of the camera assembly 102 on the rear view cover 108 as well as tuning the angular position of the camera assembly 102 with respect to the rear view cover 108.

Figures 9, 9A:
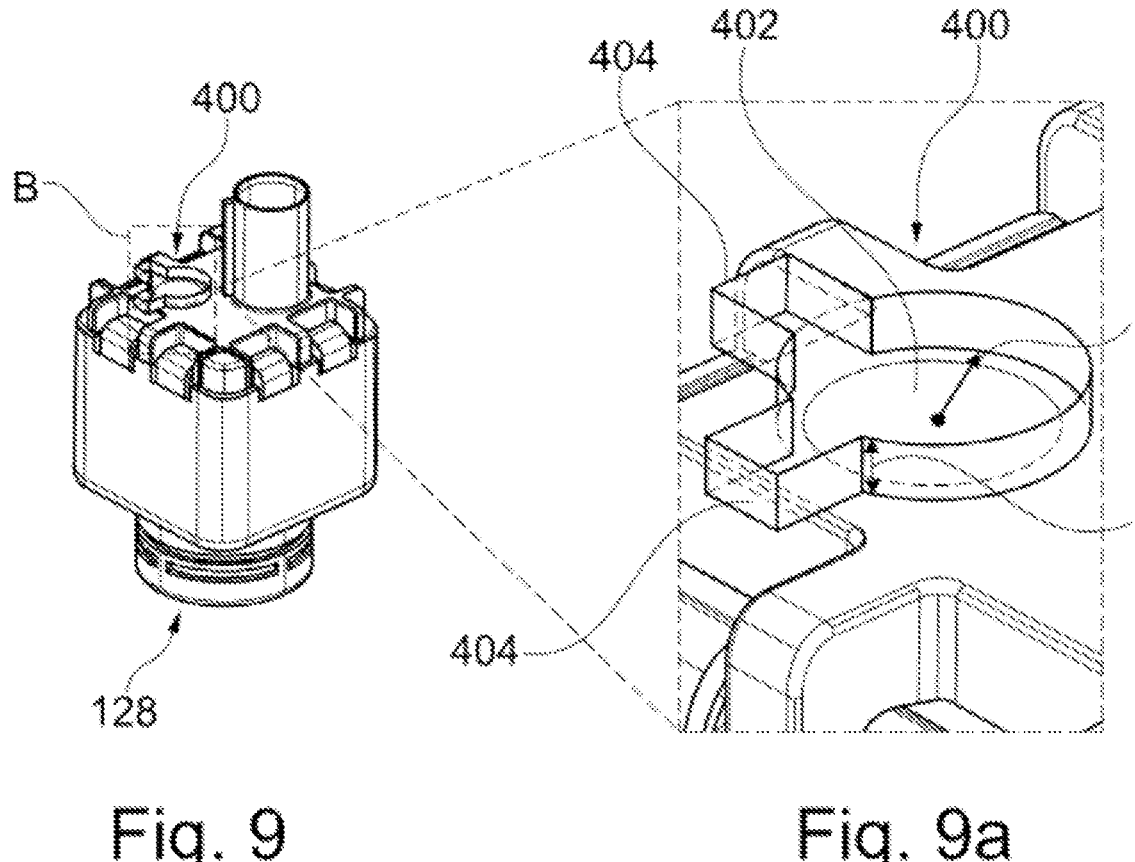
FIG. 9 illustrates a perspective view of the camera module having a ventilation element.
FIG. 9*a* illustrates an enlarged portion "B" of the ventilation element shown in FIG. 9.

FIG. 9 illustrates an embodiment of the camera module 128. The camera module 128 may include a ventilation element 400. The ventilation element 400 include a hole 402 on the body of the camera module 128. The hole 402 is covered with vents 404 which has opening outside the camera module 128. As shown in FIG. 9a, the hole 402 of the ventilation element 400 has a radius R and the vents 404 have a thickness H. The ventilation element 400 including the hole 402 and the vents 404 is configured to dissipate heat from the body of the camera module 128 to the outside environment. Thus, the ventilation element 400 is advantageous in cooling down the camera module 128 and prevents overheating.

According to the first embodiment of the camera assembly fixing arrangement 100 as shown in FIGS. 1-9, the rear view cover 108 may be a lower housing. In a second embodiment, the rear view cover may be a bezel, which is described below in FIGS. 10-14. In both embodiments the mounting for the camera location varies, but the camera aperture 110 is in the lower housing for both of the described mounting systems.

Figure 10:
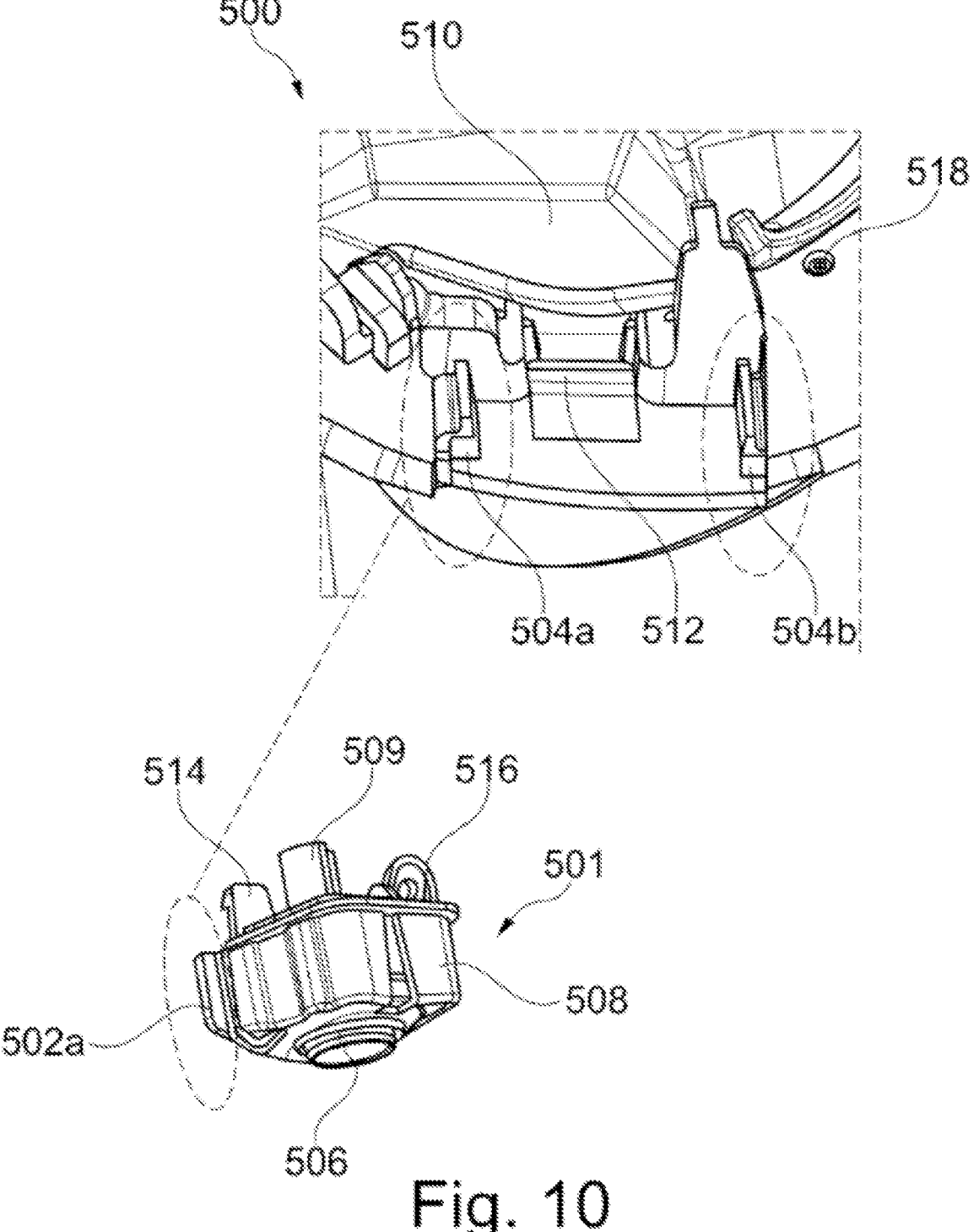
FIG. 10 illustrates a perspective view of a camera assembly arrangement in disassembled state in accordance with a second embodiment of the present disclosure.

According to a second embodiment, as shown in FIG. 10, which illustrates a perspective view of the camera assembly arrangement 500, the camera assembly arrangement 500 comprises a rear view cover 510 and a camera assembly 501. In FIG. 10, the camera assembly 501 is shown exploded out from the rear view cover 510. The rear view cover 510 has at least one shoulder 512 which is configured to cooperate with at least one clip fastener 514 configured on a camera cradle 508 of the camera assembly 501. The at least one clip fastener 514 and the at least one shoulder 512 have the same construction and function as the at least one clip fastener 112 and the at least one shoulder 124 of the first embodiment and hence not described in this embodiment. However, in this embodiment, the at least one clip fastener 514 is configured on the camera cradle 508 of the camera assembly 501, and the at least one shoulder 512 is configured on the rear view cover 510.

The rear view cover 510 further comprises at least one alignment element 504a, 504b. The at least one alignment element 504a, 504b are groove-like structure which form two channels in the rear view cover 510 for allowing at least one outrigger slider 502 of the camera assembly 501 to slide inside the at least one alignment element 504a, 504b, also shown in FIG. 13. In the illustrated embodiment, the rear view cover 510 includes two alignment elements 504a and 504b, and the camera assembly 501 includes two outrigger sliders 502. The alignment element 504a of the rear view cover 510 cooperate with the outrigger slider 502a of the camera assembly 501, and the alignment element 504b of the rear view cover 510 cooperate with another outrigger slider (not shown) of the camera assembly 501. The at least one alignment element 504a, 504b restrict the movement of the camera assembly 501 in all directions except longitudinally along the channels. The camera assembly 501 includes the camera cradle 508 and a camera module 509. As shown in FIG. 10, a lens 506 of the camera module 509 extends outward from the camera cradle 508.

The rear view cover 510 further includes an attachment element 518. The attachment element 518 is configured on the rear view cover 510. The attachment element 518 may include a threaded hole for fastening a camera cradle 508 of the camera assembly 501 via a fastener. The camera cradle 508 has an arm 516 which is aligned with the attachment element 518 of the rear view cover 510. After the alignment of the arm 516 of the camera cradle 508 with the attachment element 518, the fastener is fastened to secure the camera assembly 501 on the rear view cover 510.

Figure 11:
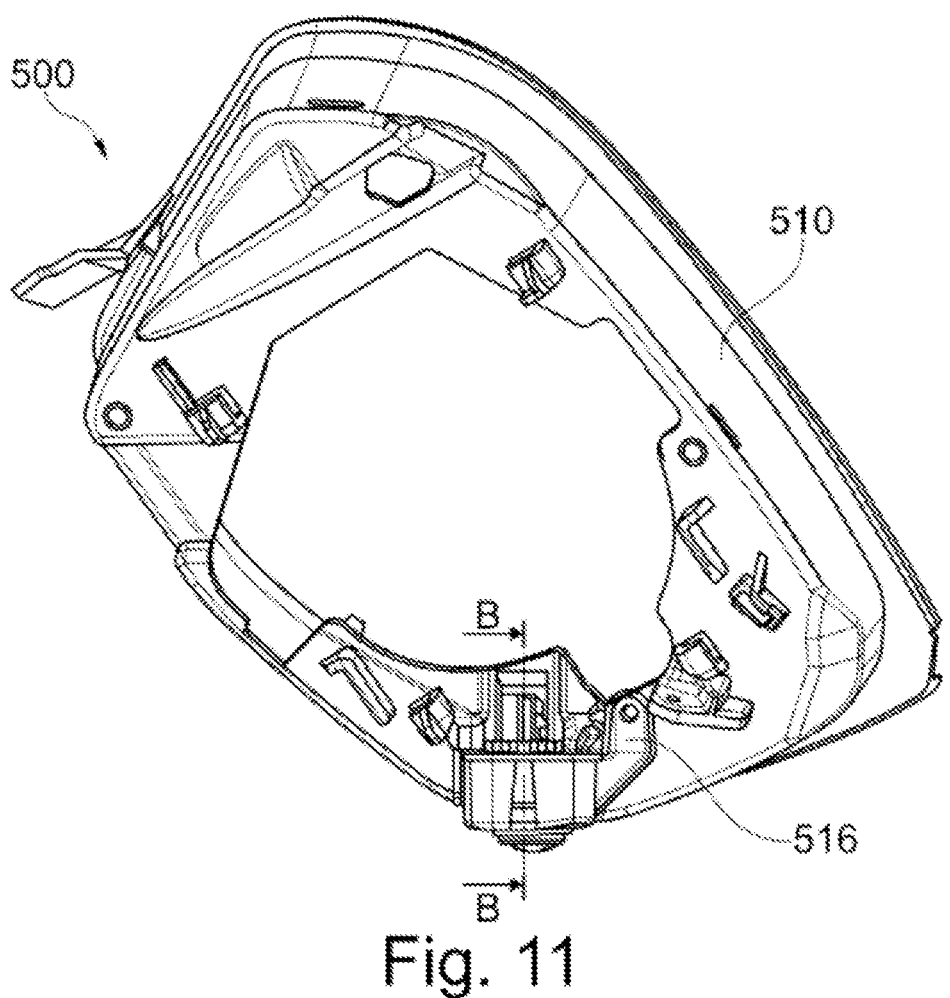
FIG. 11 illustrates a rear perspective view of the camera assembly arrangement of FIG. 10 showing the camera assembly in assembled state.

FIG. 11 illustrates a perspective view of the camera assembly arrangement 500 of FIG. 10 in which the camera assembly 501 is assembled with the rear view cover 510.

Figure 12:
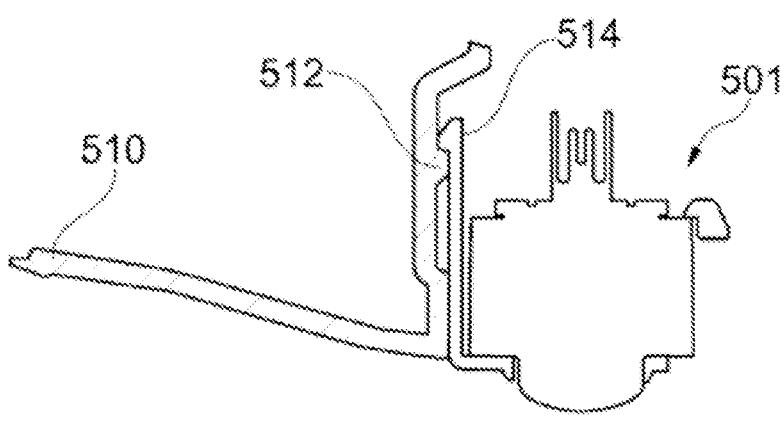
FIG. 12 illustrates a sectional view "B-B" the camera assembly of FIG. 11.

FIG. 12 illustrates a sectional view 'B-B' of the camera assembly 501 shown in FIG. 11. As shown in FIG. 12, the at least one shoulder 512 configured on the rear view cover 510 cooperates with at least one clip fastener 514 configured on the camera assembly 501. The at least one clip fastener 514 is retained on the at least one shoulder 512 for mounting the camera assembly 501 on the rear view cover 510.

Figure 13:
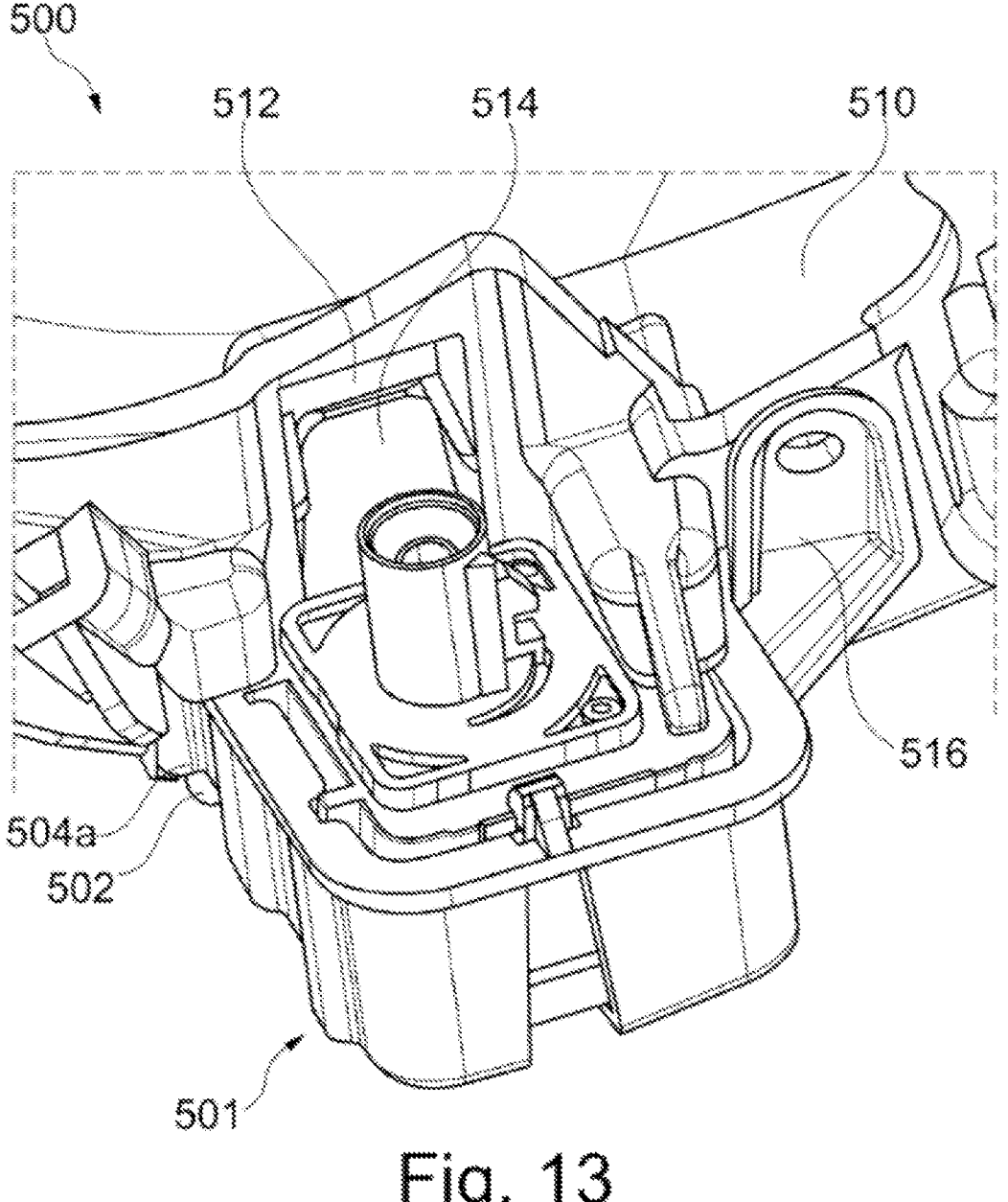
FIG. 13 illustrates perspective view of camera assembly arrangement of FIG. 10 showing the camera assembly in assembled state.

FIG. 13 illustrates perspective view of the camera assembly arrangement 500 showing the camera assembly 501 in assembled state. As shown in FIG. 13, the outrigger slider 502 of the camera assembly 501 is completely inserted in the at least one alignment elements 504a. This configuration of the at least one clip fastener 514 with the at least one shoulder 512 and the at least one alignment element 504a, 504b with the at least one outrigger slider 502 provides stability to the camera assembly 501 in the rear view cover 510 and provides resistance to mechanical vibrations. The arm 516 is aligned with the attachment element 518 (shown in FIG. 10) of the rear view cover 510. After the alignment of the arm 516 of the camera cradle 508 with the attachment element 518 (shown in FIG. 10), the fastener is fastened to secure the camera assembly 501 on the rear view cover 510. The arm 516 also acts like a poke yoke since the arm 516 ensures correct alignment of camera assembly 501 on the rear view cover 510. If the arm 516 is not aligned with the attachment element 518 (shown in FIG. 10) then the camera assembly 501 is not in the correct place.

Figure 14:
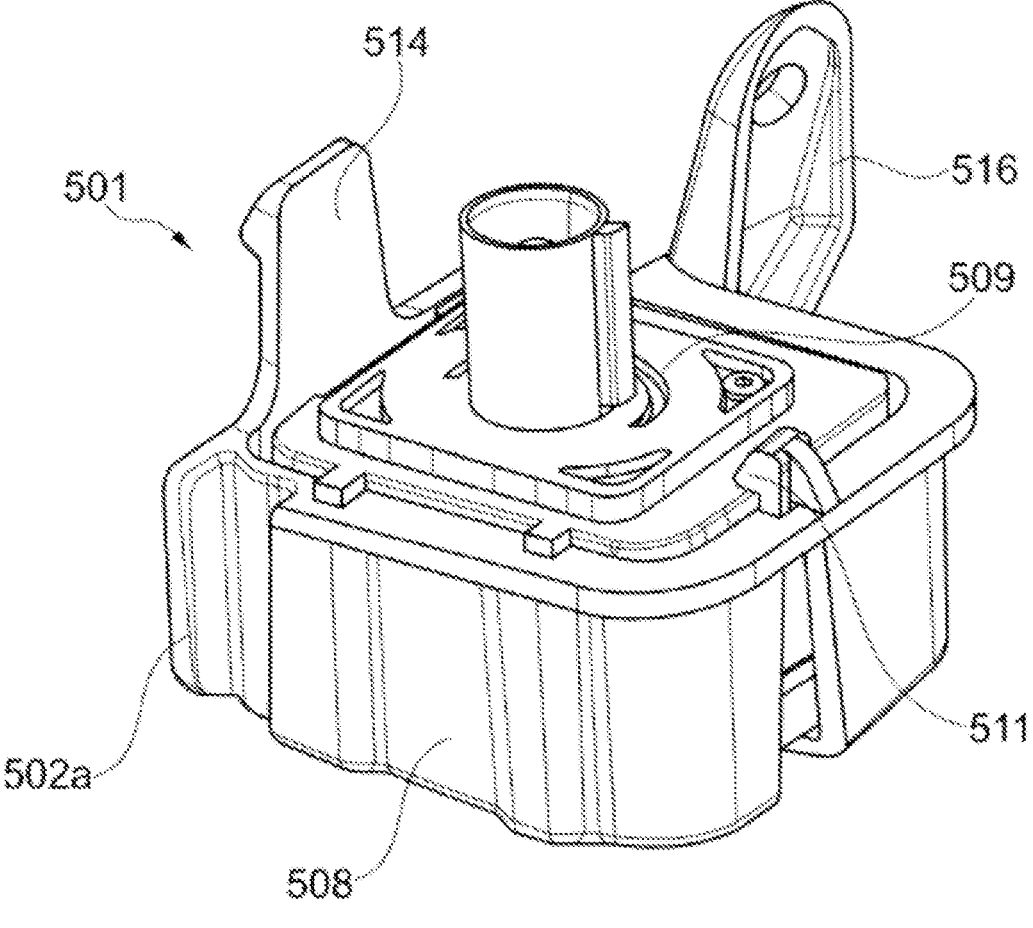
FIG. 14 illustrates the camera assembly of FIG. 10 showing the configuration of camera module inside the camera cradle.

FIG. 14 illustrates the camera assembly 501 showing the configuration of camera module 509 inside the camera cradle 508. The construction of camera module 509 is similar to the embodiment of camera module 128 of the first embodiment shown in FIGS. 1-9. The camera cradle 508 is also similar to the camera cradle 104 of the first embodiment shown in FIGS. 1-9 with minor modifications, which will be described herein. The camera cradle 508 includes a camera module clip 511 for holding the camera module 509 inside the camera cradle 508. In the first embodiment of FIGS. 1-9, the camera module 128 is retained inside the camera cradle 104 by using the cover 126 and the clamp 116. The cover 126, the clamp 116 and the extended arm 123 of the first embodiment constitute the same function as the camera module clip 511 in the embodiment of FIGS. 10-14.

The camera module 509 is adapted to be mounted inside the inner portion of the camera cradle 508 such that the lens (506) of the camera module 509 extends out from the camera cradle 508 (shown in FIG. 10). The camera cradle 508 includes an arm 516, shown in FIGS. 10, 11, 13 and 14. The arm 516 of the camera cradle 508 has a circular hole, which aligns with the threaded hole of the attachment element 518 of the rear view cover 510, as shown in FIG. 10 and FIG. 13. Once the holes are aligned, the fastener (not shown) is fastened for fixing the camera cradle 508 of the camera assembly 501 on the rear view cover 510.

Figure 15:
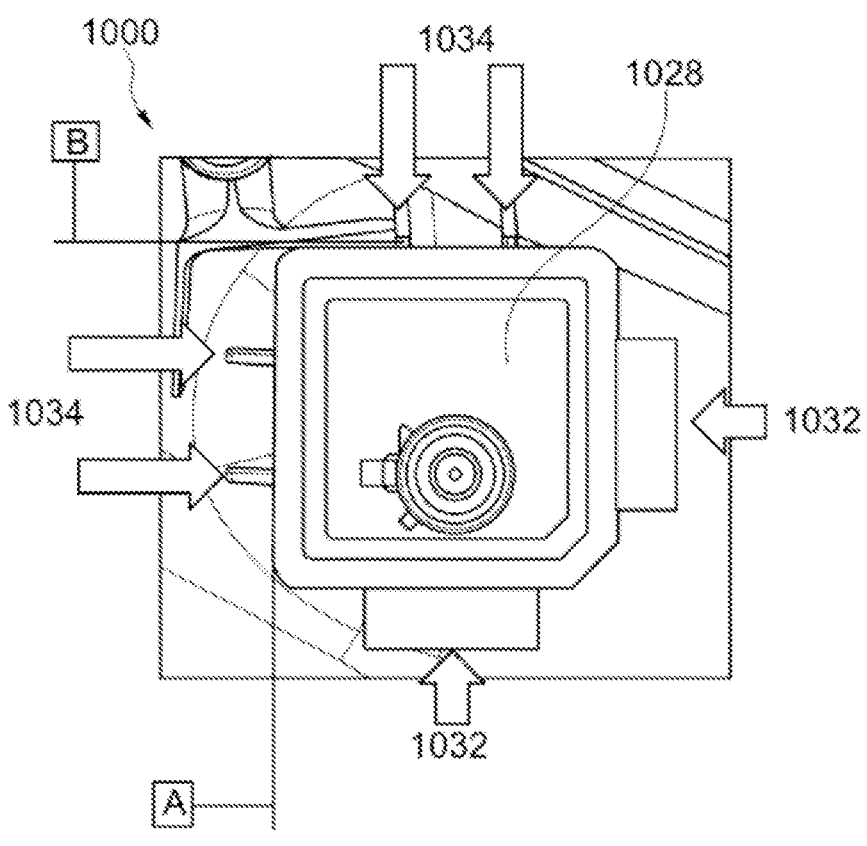
FIG. 15 illustrates a view on an alternative camera assembly arrangement.

In the prior art, a vehicle rear view cover often is provided with eight positioning ribs in order to allow an assembly play and within this play rotational positions can be scattered up to 2-3°. This effects the picture position and quality of the camera on the car level. In contrast, high requirement to the precise orientation of the camera is fulfilled by a camera assembly arrangement 1000 shown in FIGS. 15 and 16. In this embodiment, a vehicle rear view cover 1008 is provided with a plurality of alignment elements, namely two spring elements 1032 and four stiff ribs 1034. As can be best seen in FIG. 4, the alignment element arrangement is such that a square is provided for mounting a camera module 1028, with two sides of the square having a spring element 1032 and the other two sides each having two stiff ribs 1034, such that two stiff ribs 1034 are arranged opposite one spring element 1032, with the two spring elements 1032 being arranged at two sides next to each other.

Figure 16:
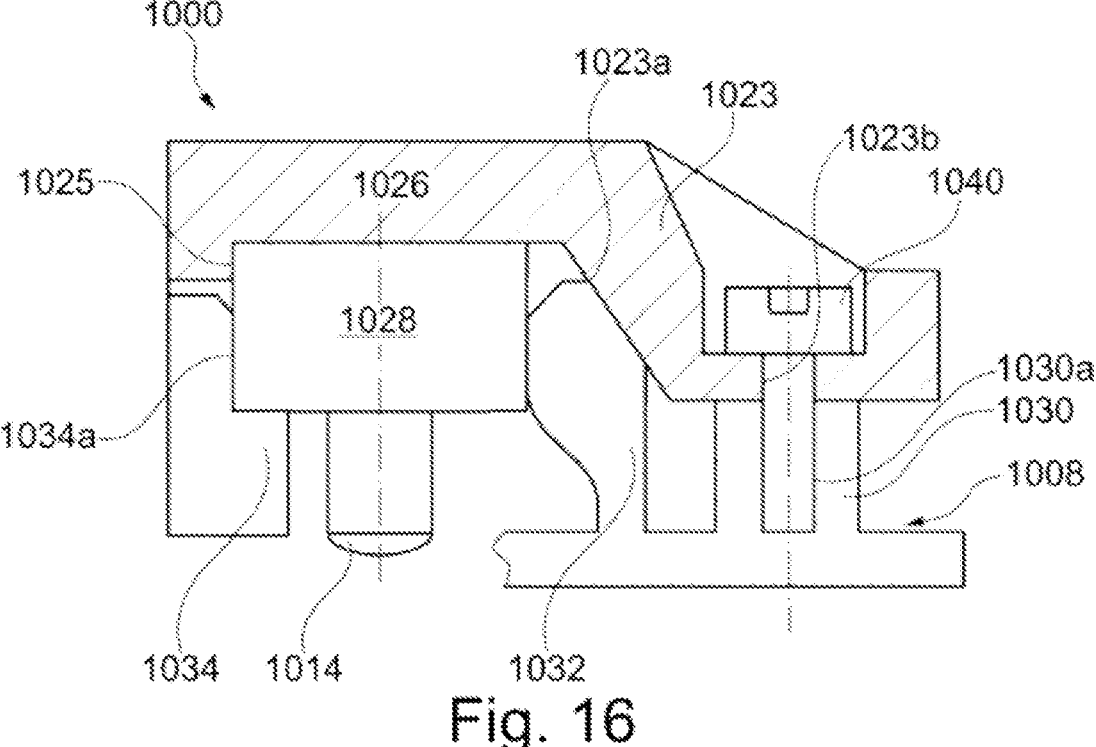
FIG. 16 illustrates a cross section of the camera assembly arrangement of FIG. 15.

As best seen in FIG. 16 a cover 1026 presses the camera module 1028 into the space arranged between the alignment element 1023, 1034 and is fixed to the vehicle rear view cover 1008 via a screw 1040.

The cover 1026 is provided with an extended arm 1023 with a hole 1023*b* aligned to a hole 1030*a* provided by an attachment element 1030 of the vehicle rear view cover 1008 such that the screw 1040 can pass through the aligned holes 1023*b*, 1030*a*. The cover 1026 also comprises a shoulder 1025 opposite the extended arm 1023 to press the camera module 1028 onto a shoulder 1034*a* provided by the rib 1034 as shown in FIG. 16. Still further, the cover 1026 is provided with a ramp 1023*a* at its extended arm 1023 such that fastening the screw 1040 will lead to press the spring element 1032 against the camera module 1028 and, thus, the camera module 1028 against the stiff rib 1034, which in turn will press the camera module 1028 onto the vehicle rear view cover 1008.

After the final screwing, the spring elements 1032 will be locked to avoid any movement of the camera module 1028 due to vibration or temperature in assembled situation. This play-free fixation allows to avoid 2-3° rotation due to camera module tolerances and plastic part tolerances and decreases it to zero.

Figure 17:
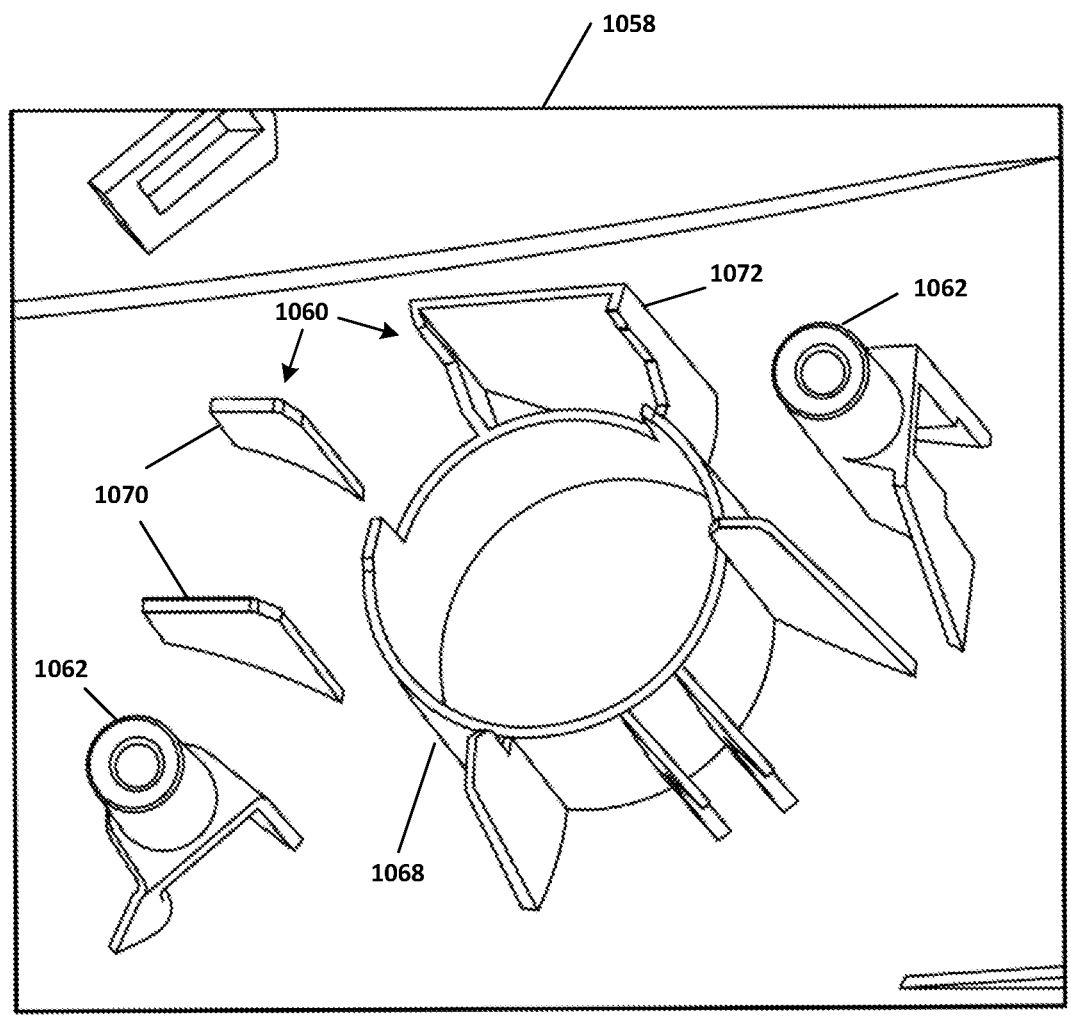
FIG. 17 illustrates a view of a rear view cover.
Figure 18:
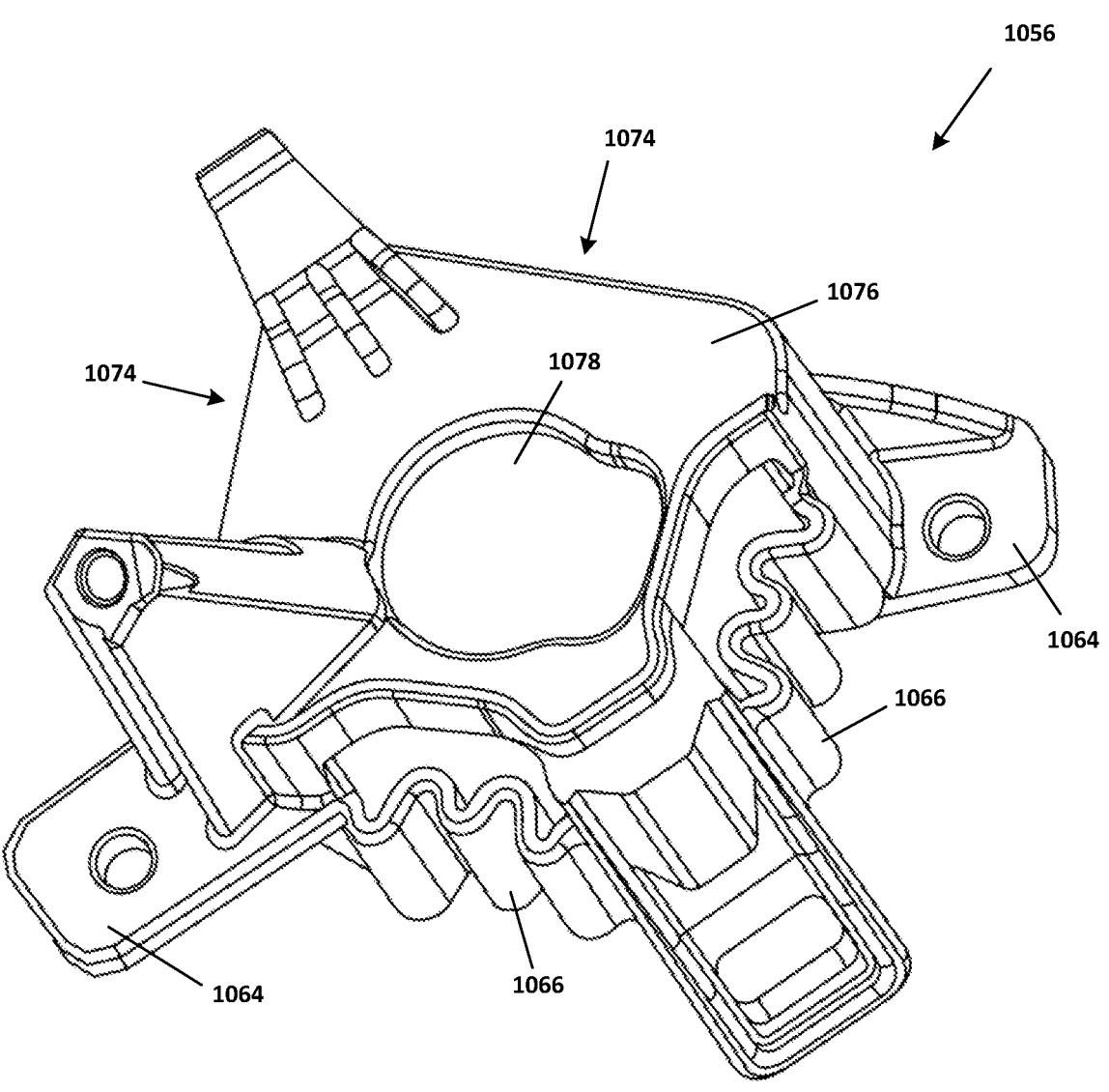
FIG. 18 illustrates a view of a camera cradle.
Figure 19:
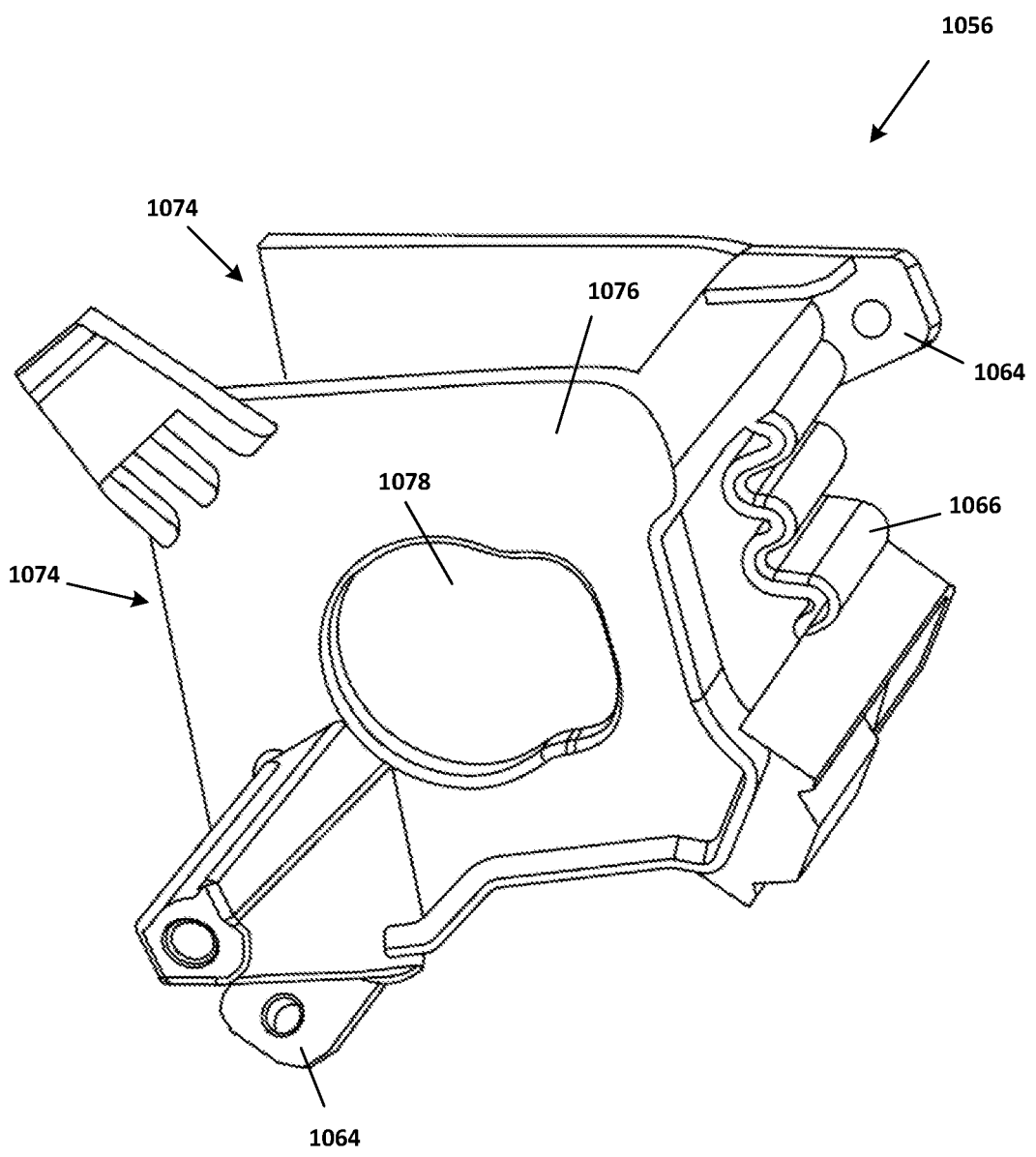
FIG. 19 illustrates another view of a camera cradle.
Figure 20:
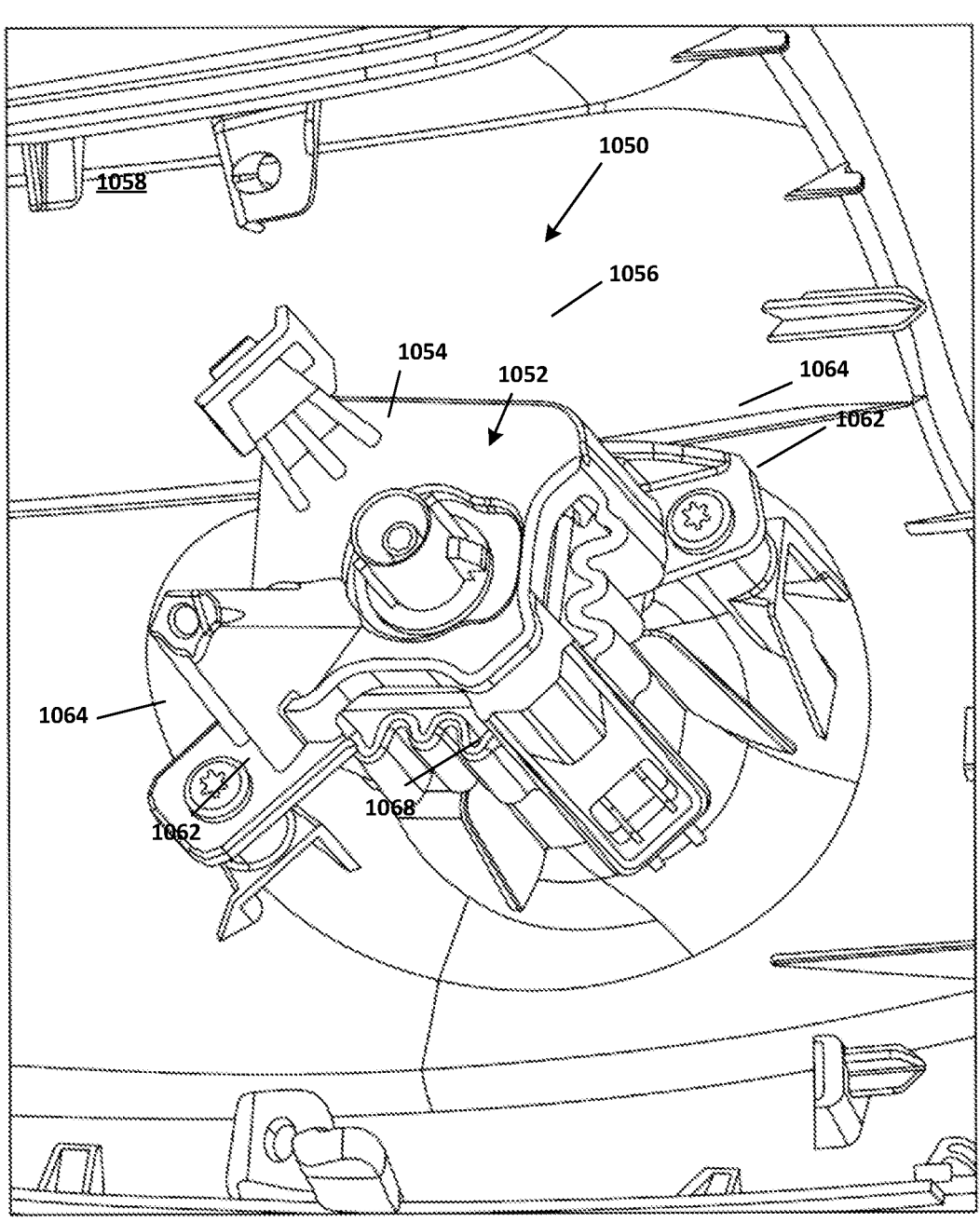
FIG. 20 illustrates a view of an example camera assembly arrangement.

FIGS. 17-20 illustrate a camera assembly arrangement according to another embodiment. The example embodiment depicted in FIGS. 17-20 includes a camera assembly 1050 that comprises a camera module 1052 with a lens 1054 and a camera cradle 1056 for mounting the camera module, and a rear view cover 1058 of a vehicle rear view device onto which the camera assembly 1050 is mounted (as shown in FIG. 20). As shown in FIG. 17, the rear view cover 1058 includes a plurality of alignment elements 1060 and at least one attachment element 1062. As shown in FIGS. 18 and 19, the camera cradle 1056 includes at least one attachment arm 1064 that secures the camera assembly 1050 to the at least one attachment element 1062 of the rear view cover 1058 (as shown in FIG. 20). The camera cradle 1056 further includes a plurality of spring elements 1066 that are configured to press the camera module 1052 against the plurality of alignment elements 1060 of the rear view cover 1058 to align the at least one attachment arm 1064 of the camera cradle 1056 with the at least one attachment element 1062 of the rear view cover 1058 and to restrict movement of the camera assembly 1050 when secured to the rear view cover 1058.

FIG. 17 depicts a view of the rear view cover 1058 without the camera assembly 1050 mounted. In embodiments, the depicted rear view cover 1058 may, for example, be part of a lower housing or a bezel of the rear view device. As shown in FIG. 17, the rear view cover 1058 may include a plurality of attachment elements 1062 for securing the camera assembly 1050. In the illustrated embodiment, the attachment elements 1062 include treaded holes for receiving fasteners (e.g., screws) to secure the attachment arms 1064 of the camera cradle 1056 (as shown in FIG. 20). The illustrated embodiment further includes alignment elements 1060 in the form of a plurality of alignment ribs 1070 and an alignment wall 1072, and a mounting pedestal 1068 onto which the camera assembly 1050 is positioned (as shown in FIG. 20). The plurality of alignment ribs 1070, alignment wall 1072, and mounting pedestal 1068 in the illustrated embodiment form three positioning planes for aligning and securing the camera assembly 1050 to the rear view cover 1058. Specifically, the mounting pedestal 1068 provides a first positioning plane that is parallel to a surface of the rear view cover 1058, and the alignment ribs 1070 and alignment wall 1072 provide positioning planes that are perpendicular to the surface of the rear view cover 1058 and 90° oriented to each other.

FIGS. 18 and 19 respectively depict views of the camera cradle 1056 from different angles. As shown in FIGS. 18 and 19, the camera cradle 1056 includes two side portions that comprise the spring elements 1066, two open sides 1074, and a bottom portion 1076. The bottom portion 1076 of the camera cradle 1056 has an opening 1078 corresponding to the shape of the lens 1054 of the camera module 1052 for allowing the lens 1054 to extend through the opening 1078 and outside of the camera cradle 1056 (as shown in FIG. 20). The camera cradle 1056 further includes two attachment arms 1064 for securing the camera cradle 1056 to the attachment elements 1062 of the rear view cover 1058, for example using fasteners (e.g., screws) extending through holes in the attachment arms 1064 and into threaded openings in the attachment elements 1062 (as shown in FIG. 20). The spring elements 1066 of the camera cradle 1056 are configured to exert force on the camera module 1052 and push the camera module 1052 in a direction of the two open sides 1074 of the camera cradle 1056. In this way, when the camera cradle 1056 is secured to the rear view cover 1058 (as shown in FIG. 20), the spring elements 1066 press the camera module 1052 against the alignment elements 1060 of the rear view cover 1058 through the open sides 1074 of the camera cradle 1056, thus helping to restrict movement of the camera assembly 1050 when secured to the rear view cover 1058.

FIG. 20 depicts an example of the camera assembly 1050 mounted to the rear view cover 1058. As shown in FIG. 20, the example camera assembly 1050 may be secured to the rear view cover 1058 with fasteners (e.g., screws) extending through holes in the attachment arms 1064 of the camera cradle 1056 and into threaded openings in the attachment elements 1062 of the rear view cover 1058. The camera assembly 1050 is aligned with and further secured to the rear view cover 1058 by the spring elements 1066 of the camera cradle 1056 pressing the camera module 1052 against the alignment elements 1060 of the rear view cover 1058 and by the mounting pedestal 1068. In the illustrated embodiment, when the screws are tightened to secure the attachment arms 1064 of the camera cradle 1056 to the attachment elements 1062 of the rear view cover 1058, the torque of the screws creates pressure towards the alignment elements 1060 and mounting pedestal 1068. In this way, torque applied to fasten the attachment arms 1064 to the attachment elements 1062 restricts movement of the camera assembly 1050 by pushing the camera assembly 1050 into the plurality of alignment elements 1060 and the mounting pedestal 1068.

The foregoing description of various embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated.

REFERENCE SIGN LIST

100 Camera assembly arrangement
102 Camera assembly
104 Camera cradle
106 Outrigger slider
108 Vehicle rear view cover
110 Aperture
112 Clip fastener
112*a* Clip
114 Lens
115 Opening
116 Clamp
118 First alignment element
120 Second alignment element
122 Arm
123 Extended arm of the cover
124 Shoulder
126 Cover
127 Hook
127*a* Loop
128 Camera module
129 Clip
130 Attachment element
200 Plate
202 Plate 204 Plate
206 Plate
300 Ribs
302 Stand-off pads
304 Side portion
306 Supporting protrusion
308 Outer surface
310 Bottom portion
400 Ventilation element
402 Hole
404 Vents
500 Camera assembly arrangement
501 Camera assembly
502 Outrigger slider
504*a*, 504*b* Alignment element
506 Lens
508 Camera Cradle
509 Camera module
510 Rear view cover
511 Camera module clip
512 Shoulder
514 Clip fastener
516 Arm
518 Attachment element
1000 Camera assembly arrangement
1008 Vehicle rear view cover
1014 Lens
1023 Extended arm of cover
1023*a* Ramp
1023*b* Hole
1025 Shoulder
1026 Cover
1028 Camera module
1030 Attachment element
1030*a* Hole
130*b* Spring element
1034 Stiff rib
1034*a* Shoulder
1040 Screw
1050 Camera Assembly
1052 Camera Module
1054 Camera Lens
1056 Camera Cradle
1058 Rear View Cover
1060 Alignment Elements
1062 Attachment Elements
1064 Attachment Arm
1066 Camera Cradle Spring Elements
1068 Mounting Pedestal
1070 Alignment Ribs
1072 Alignment Wall
1074 Opens Sides of Camera Cradle
A-A Cross Section A-A
B-B Cross Section B-B
H Height
R Radius It is claimed:

1. A vehicle rear view device, comprising;
a camera assembly that includes a camera module with a lens and a camera cradle for mounting the camera module, wherein the camera cradle includes a plurality of outrigger sliders and an attachment arm; and
a rear view cover that includes a plurality of alignment elements, a mounting pedestal onto which the camera assembly is mounted, and an attachment element, wherein the attachment element secures the attachment arm of the camera cradle to the rear view cover, wherein each of the plurality of alignment elements form a channel for receiving one of the plurality of outrigger sliders of the camera cradle, wherein the plurality of alignment elements and the mounting pedestal are configured to (i) restrict movement of the camera assembly in all directions except longitudinally along the channels and (ii) align the attachment arm of the camera cradle with the attachment element, and wherein force applied to fasten the attachment arm to the attachment element restricts movement of the camera assembly by pushing the camera assembly into the plurality of alignment elements and the mounting pedestal.

2. The vehicle rear view device of claim 1, wherein the attachment element of the rear view cover includes threading for receiving a fastener, and the attachment arm includes a hole through which the fastener is extended to secure the attachment arm to the attachment element.

3. The vehicle rear view device of claim 1, wherein the camera cradle includes a clip fastener that is configured to engage with a shoulder portion of the rear view cover to further secure the camera assembly to the rear view cover.

4. The vehicle rear view device of claim 1, wherein the lens of the camera assembly is configured to be inserted into an aperture of the rear view cover.

5. The vehicle rear view device of claim 1, wherein the camera cradle has an inside surface with at least one rib and at least one stand-off pad.

6. The vehicle rear view device of claim 5, wherein the at least one stand-off pad and at least one rib are configured to align the camera module in the camera cradle.

7. The vehicle rear view device of claim 1, wherein the camera assembly includes a cover and a clamp for mounting the camera module inside the camera cradle.

8. The vehicle rear view device of claim 1, wherein the camera module includes a ventilation element.

9. The vehicle rear view device of claim 1, wherein the rear view cover is a lower housing of the rear view device.

10. The vehicle rear view device of claim 1, wherein the rear view cover is a bezel of the rear view device.

* * * * *